United States Patent
Hu et al.

(10) Patent No.: US 11,093,829 B2
(45) Date of Patent: *Aug. 17, 2021

(54) INTERACTION-AWARE DECISION MAKING

(71) Applicant: Honda Motor Co., Ltd., Tokyo (JP)

(72) Inventors: Yeping Hu, Albany, CA (US); Alireza Nakhaei Sarvedani, Sunnyvale, CA (US); Masayoshi Tomizuka, Berkeley, CA (US); Kikuo Fujimura, Palo Alto, CA (US)

(73) Assignee: Honda Motor Co., Ltd., Tokyo (JP)

(*) Notice: Subject to any disclaimer, the term of this patent is extended or adjusted under 35 U.S.C. 154(b) by 295 days.

This patent is subject to a terminal disclaimer.

(21) Appl. No.: 16/397,752

(22) Filed: Apr. 29, 2019

(65) Prior Publication Data
US 2019/0266489 A1    Aug. 29, 2019

Related U.S. Application Data

(63) Continuation-in-part of application No. 16/103,847, filed on Aug. 14, 2018, now Pat. No. 10,739,776, and
(Continued)

(51) Int. Cl.
*G06N 3/08* (2006.01)
*G05D 1/00* (2006.01)
(Continued)

(52) U.S. Cl.
CPC ............ *G06N 3/08* (2013.01); *B60W 10/04* (2013.01); *B60W 10/18* (2013.01); *B60W 10/20* (2013.01);
(Continued)

(58) Field of Classification Search
CPC ...... B60W 10/04; B60W 10/18; B60W 10/20; B60W 2050/0014; B60W 2556/00;
(Continued)

(56) References Cited

U.S. PATENT DOCUMENTS

| | | | |
|---|---|---|---|
| 6,405,132 B1* | 6/2002 | Breed | G01S 7/4802 701/301 |
| 9,015,093 B1* | 4/2015 | Commons | G01C 21/3602 706/26 |

(Continued)

OTHER PUBLICATIONS

Austerweil, J. L., Brawner, S., Greenwald, A., Hilliard, E., Ho, M., Littman, M. L., MacGlashan, J., and Trimbach, C. (2016). How other-regarding preferences can promote cooperation in non-zero-sum grid games. In Proceedings of the AAAI Symposium on Challenges and Opportunities in Multiagent Learning for the Real World.

(Continued)

*Primary Examiner* — Babar Sarwar
(74) *Attorney, Agent, or Firm* — Rankin, Hill & Clark LLP

(57) ABSTRACT

Interaction-aware decision making may include training a first agent based on a first policy gradient, training a first critic based on a first loss function to learn goals in a single-agent environment using a Markov decision process, training a number N of agents based on the first policy gradient, training a second policy gradient and a second critic based on the first loss function and a second loss function to learn goals in a multi-agent environment using a Markov game to instantiate a second agent neural network, and generating an interaction-aware decision making network policy based on the first agent neural network and the second agent neural network. The N number of agents may be associated with a driver type indicative of a level of cooperation. When a collision occurs, a negative reward or penalty may be assigned to each agent involved based on a lane priority level of respective agents.

18 Claims, 23 Drawing Sheets

Related U.S. Application Data a continuation-in-part of application No. 16/193,291, filed on Nov. 16, 2018.

(60) Provisional application No. 62/731,729, filed on Sep. 14, 2018, provisional application No. 62/571,717, filed on Oct. 12, 2017.

(51) Int. Cl.
| | |
|---|---|
| *B60W 10/04* | (2006.01) |
| *B60W 10/18* | (2012.01) |
| *B60W 10/20* | (2006.01) |
| *B60W 30/18* | (2012.01) |
| *B60W 50/00* | (2006.01) |

(52) U.S. Cl.
CPC ............... *B60W 30/18109* (2013.01); *B60W 30/18163* (2013.01); *B60W 50/00* (2013.01); *G05D 1/0088* (2013.01); *B60W 2050/0014* (2013.01); *B60W 2556/00* (2020.02); *B60W 2710/18* (2013.01); *B60W 2710/20* (2013.01); *B60W 2720/106* (2013.01)

(58) Field of Classification Search
CPC ......... B60W 2710/18; B60W 2710/20; B60W 2720/106; B60W 30/18109; B60W 30/18163; B60W 50/00; G05D 1/0088; G06N 3/08
See application file for complete search history.

(56) References Cited

U.S. PATENT DOCUMENTS

| | | | | |
|---|---|---|---|---|
| 9,632,502 | B1* | 4/2017 | Levinson | H04L 67/12 |
| 2016/0257305 | A1* | 9/2016 | Riviere-Cazaux | B60W 10/18 |
| 2017/0031361 | A1* | 2/2017 | Olson | G08G 1/167 |
| 2017/0236052 | A1* | 8/2017 | Israelsson | G08G 1/0129 706/21 |
| 2018/0060701 | A1* | 3/2018 | Krishnamurthy | G06K 9/6255 |
| 2018/0107215 | A1* | 4/2018 | Djuric | G06N 3/04 |
| 2018/0120843 | A1* | 5/2018 | Berntorp | G05D 1/0221 |
| 2018/0121768 | A1* | 5/2018 | Lin | G06K 9/4628 |
| 2018/0150701 | A1* | 5/2018 | Kang | G06K 9/78 |
| 2018/0373980 | A1* | 12/2018 | Huval | G06K 9/00805 |
| 2019/0065951 | A1* | 2/2019 | Luo | H04W 4/40 |
| 2019/0228571 | A1* | 7/2019 | Atsmon | G06T 19/006 |
| 2019/0243372 | A1* | 8/2019 | Huval | G08G 1/167 |
| 2019/0291727 | A1* | 9/2019 | Shalev-Shwartz | B60W 10/04 |

OTHER PUBLICATIONS

C. R. Baker and J. M. Dolan, "Traffic interaction in the urban challenge: Putting boss on its best behavior," in 2008 IEEE/RSJ International Conference on Intelligent Robots and Systems (IROS), pp. 1752-1758.
Bansal, T., Pachocki, J., Sidor, S., Sutskever, I., and Mordatch, I. (2017). Emergent complexity via multi-agent competition. arXiv preprint arXiv:1710.03748.
Bengio, Y., Louradour, J., Collobert, R., and Weston, J. (2009). Curriculum learning. In Proceedings of the 26th annual international conference on machine learning, pp. 41-48. ACM.
M. Bojarski, D. Del Testa, D. Dworakowski, B. Firner, B. Flepp, P. Goyal, L. D. Jackel, M. Monfort, U. Muller, J. Zhang, et al., "End to end learning for self-driving cars," arXiv preprint arXiv:1604. 07316, 2016.
Cao, Y., Yu, W., Ren, W., and Chen, G. (2013). An overview of recent progress in the study of distributed multi-agent coordination. IEEE Transactions on Industrial informatics, 9(1), 427-438.
Chang, Y.-H., Ho, T., and Kaelbling, L. P. (2004). All learning is local: Multi-agent learning in global reward games. In Advances in neural information processing systems, pp. 807-814.
C. Chen, A. Seff, A. Kornhauser, and J. Xiao, "Deepdriving: Learning affordance for direct perception in autonomous driving," In Proceedings of the IEEE International Conference on Computer Vision, pp. 2722-2730, 2015.
A. Cosgun, L. Ma, J. Chiu, J. Huang, M. Demir, A. M. Anon, T. Lian, H. Tafish, and S. Al-Stouhi, "Towards full automated drive in urban environments: A demonstration in gomentum station, california," in IEEE Intelligent Vehicles Symposium, IV 2017, Los Angeles, CA, USA, Jun. 11-14, 2017, pp. 1811-1818, 2017.
Y. Du, Y. Wang, and C.-Y. Chan, "Autonomous lane-change controller via mixed logical dynamical," in Intelligent Transportation Systems (ITSC), 2014 IEEE 17th International Conference on, pp. 1154-1159, IEEE, 2014.
P. Falcone, F. Borrelli, J. Asgari, H. E. Tseng, and D. Hrovat, "Predictive active steering control for autonomous vehicle systems," IEEE Transactions on control systems technology, vol. 15, No. 3, pp. 566-580, 2007.
Foerster, J., Farquhar, G., Afouras, T., Nardelli, N., and Whiteson, S. (2017). Counterfactual multi-agent policy gradients. arXiv preprint arXiv:1705.08926.
Gupta, J. K., Egorov, M., and Kochenderfer, M. (2017). Cooperative multi-agent control using deep reinforcement learning. In International Conference on Autonomous Agents and Multiagent Systems, pp. 66-83. Springer.
C. Hatipoglu, U. Ozguner, and K. A. Redmill, "Automated lane change controller design," IEEE transac-tions on intelligent transportation systems, vol. 4, No. 1, pp. 13-22, 2003.
Hu, J. and Wellman, M. P. (2003). Nash q-learning for general-sum stochastic games. Journal of machine learning research, (Nov. 4), 1039-1069.
C. Hubmann, M. Becker, D. Althoff, D. Lenz, and C. Stiller, "Decision making for autonomous driving considering interaction and uncertain prediction of surrounding vehicles," in 2017 IEEE Intelligent Vehicles Symposium (IV), pp. 1671-1678.
Isele, D., Cosgun, A., Subramanian, K., and Fujimura, K. (2017). Navigating intersections with autonomous vehicles using deep reinforcement learning. arXiv preprint arXiv:1705.01196.
H. Jula, E. B. Kosmatopoulos, and P. A. Ioannou, "Collision avoidance analysis for lane changing and merging," IEEE Transactions on vehicular technology, vol. 49, No. 6, pp. 2295-2308, 2000.
Konda, V. R. and Tsitsiklis, J. N. (2000). Actor-critic algorithms. In Advances in neural information processing systems, pp. 1008-1014.
J. Koutnik, G. Cuccu, J. Schmidhuber, and F. Gomez, "Evolving large-scale neural networks for vision-based torcs," 2013.
D. Krajzewicz, J. Erdmann, M. Behrisch, and L. Bieker, "Recent development and applications of sumo-simulation of urban mobility," International Journal on Advances in Systems and Measurements, vol. 5, No. 3&4, pp. 128-138, 2012.
S. Krauß, P. Wagner, and C. Gawron, "Metastable states in a microscopic model of traffic flow," Physical Review E, vol. 55, No. 5, p. 5597, 1997.
Kuefler, A., Morton, J., Wheeler, T., and Kochenderfer, M. (2017). Imitating driver behavior with generative adversarial networks. arXiv preprint arXiv:1701.06699.
Leibo, J. Z., Zambaldi, V., Lanctot, M., Marecki, J., and Graepel, T. (2017). Multi-agent reinforcement learning in sequential social dilemmas. In Proceedings of the 16th Conference on Autonomous Agents and MultiAgent Systems, pp. 464-473. International Foundation for Autonomous Agents and Multiagent Systems.
Lillicrap, T. P., Hunt, J. J., Pritzel, A., Heess, N., Erez, T., Tassa, Y., Silver, D., and Wierstra, D. (2015). Continuous control with deep reinforcement learning. arXiv preprint arXiv:1509.02971.
Littman., M.L. (1994). Markov games as a framework for multi-agent reinforcement learning. In Machine Learning Proceedings 1994, pp. 157-163. Elsevier.
Lowe R., Wu, Y., Tamar, A., Harb, J., Abbeel, O. P., and Mordatch, I. (2017). Multi-agent actor-critic for mixed cooperative-competitive environments. In Advances in Neural Information Processing Systems, pp. 6382-6393.
Malder, R. T. And Arora, J. S. (2004). Survey of multi-objective optimization methods for engineering. Structural and multidisciplinary optimization, 26(6), 369-395.

(56) References Cited

OTHER PUBLICATIONS

I. Miller et al., "Team Cornell's Skynet: Robust perception and planning in an urban environment," J. Field Robot., vol. 25, No. 8, pp. 493-527, 2008.
V. Mnih, K. Kavukcuoglu, D. Silver, A. A. Rusu, J. Veness, M. G. Bellemare, A. Graves, M. Riedmiller, A. K. Fidjeland, G. Ostrovski, et al., "Human-level control through deep reinforcement learning," Nature, vol. 518, No. 7540, pp. 529-533, 2015.
M. Montemerlo et al., "Junior: The Stanford entry in the urban challenge," J. Field Robot., vol. 25, No. 9, pp. 569-597, 2008.
Mordatch, I. and Abbeel, P. (2017). Emergence of grounded compositional language in multi-agent populations. arXiv preprint arXiv:1703.04908.
U. Muller, J. Ben, E. Cosatto, B. Flepp, and Y. L Cun, "Off-road obstacle avoidance through end-to-end learning," in Advances in neural information processing systems, pp. 739-746, 2006.
M. Mukadam, A. Cosgun, A. Nakhaei, and K. Fujimura, "Tactical Decision Making for Lane Changing with Deep Reinforcement Learning," in 31th Conference on Neural Information Processing Systems (NIPS), 2017.
J. E. Naranjo, C. Gonzalez, R. Garcia, and T. De Pedro, "Lane-change fuzzy control in autonomous vehicles for the overtaking maneuver," IEEE Transactions on Intelligent Transportation Systems, vol. 9, No. 3, pp. 438-450, 2008.
J. Nilsson and J. Sjoberg, "Strategic decision making for automated driving on two-lane, one way roads using model predictive control," in IEEE Intelligent Vehicles Symposium, 2013, pp. 1253-1258.
Oliehoek, F. A., Spaan, M. T., and Vlassis, N. (2008). Optimal and approximate q-value functions for decentralized pomdps. Journal of Artificial Intelligence Research, 32, 289-353.
Pan, S. J. and Yang, Q. (2010). A survey on transfer learning. IEEE Transactions on knowledge and data engineering, 22(10), 1345-1359.
Panait, L. and Luke, S. (2005). Cooperative multi-agent learning: The state of the art. Au-tonomous agents and multi-agent systems, 11(3), 387-434.
P. Petrov and F. Nashashibi, "Adaptive steering control for autonomous lane change maneuver," in intelligent Vehicles Symposium (IV), 2013 IEEE, pp. 835-840, IEEE, 2013.
Rusu, A. A., Rabinowitz, N. C., Desjardins, G., Soyer, H., Kirkpatrick, J., Kavukcuoglu, K., Pas-canu, R., and Hadsell, R.(2016). Progressive neural networks. arXiv preprint arXiv:1606.04671.
D. Sadigh, S. Sastry, S. A. Seshia, and A. D. Dragan, "Planning for autonomous cars that leverage effects on human actions", in Robotics: Science and Systems, 2016.
Schaul, T., Horgan, D., Gregor, K., and Silver, D. (2015). Universal value function approximators. In International Conference on Machine Learning, pp. 1312-1320.
W. Schwarting, J. Alonso-Mora, and D. Rus, "Planning and decision making for autonomous vehicles," in Annual Review of Control, Robotics, and Autonomous Systems, 2018.
S. Shalev-Shwartz, S. Shammah, A. Shashua, "On a formal model of safe and scalable self-driving cars," arXiv:1708.06374, 2017.
S. Sharifzadeh, I. Chiotellis, R. Triebel, and D. Cremers, "Learning to drive using inverse reinforcement learning and deep q-networks," arXiv preprint arXiv:1612.03653, 2016.
S. Shalev-Shwartz, S. Shammah, and A. Shashua, "Safe, multi-agent, reinforcement learning for au-tonomous driving," arXiv preprint arXiv:1610.03295, 2016.
Z. Shiller and S. Sundar, "Emergency lane-change maneuvers of autonomous vehicles," Journal of Dynamic Systems, Measurement, and Control, vol. 120, No. 1, pp. 37-44, 1998.
Silver, D., Schrittwieser, J., Simonyan, K., Antonoglou, I., Huang, A., Guez, A., Hubert, T., Baker, L., Lai, M., Bolton, A., et al. (2017). Mastering the game of go without human knowledge. Nature, 550(7676), 354.
Sutton, R. S. and Barto, A. G. (1998). Reinforcement learning: An introduction, vol. 1. MIT press Cambridge.
Notice of Allowance of U.S. Appl. No. 16/103,847 dated Apr. 15, 2020, 25 pages.
Sutton, R. S., McAllester, D. A, Singh, S. P., and Mansour, Y. (2000). Policy gradient methods for reinforcement learning with function approximation. In Advances in neural information processing systems, pp. 1057-1063.
Tampuu, A., Matiisen, T., Kodelja, D., Kuzovkin, I., Korjus, K., Aru, J., Aru, J., and Vicente, R. (2017). Multiagent cooperation and competition with deep reinforcement learning. PloS one, 12(4), e0172395.
Tan, M. (1993). Multi-agent reinforcement learning: Independent vs. cooperative agents. In Proceedings of the tenth international conference on machine learning, pp. 330-337.
A J. Taylor, J. Košecká, R. Blasi, and J. Malik, "A comparative study of vision-based lateral control strategies for autonomous highway driving," The International Journal of Robotics Research, vol. 18, No. 5, pp. 442-453, 1999.
H. Tehrani, Q. H. Do, M. Egawa, K. Muto, K. Yoneda, and S. Mita, "General behavior and motion model for automated lane change," in Intelligent Vehicles Symposium (IV), 2015 IEEE, pp. 1154-1159, IEEE, 2015.
Thrun, S. B. (1992). Efficient exploration in reinforcement learning.
C. Urmson, J. Anhalt, D. Bagnell, C. Baker, R. Bittner, M. Clark, J. Dolan, D. Duggins, T. Galatali, C. Geyer, et al., "Autonomous driving in urban environments: Boss and the urban challenge," Journal of Field Robotics, vol. 25, No. 8, pp. 425-466, 2008.
R. van der Horst and J. Hogema, Time-to-collision and collision avoidance systems. na, 1993.
Van Lange, P. A., Joireman, J., Parks, C. D., and Van Dijk, E. (2013). The psychology of social dilemmas: A review. Organizational Behavior and Human Decision Processes, 120(2), 125-141.
R. J. Williams, "Simple statistical gradient-following algorithms for connectionist reinforcement learning," in Machine learning, 1992.
P. Wolf, K. Kurzer, T. Wingert, F. Kuhnt, and J. M. Zöllner, "Adaptive Behavior Generation for Autonomous Driving using Deep Reinforcement Learning with Compact Semantic States." in 2018 IEEE Intelligent Vehicle Symposium (IV), pp. 993-1000.
H. Xu, Y. Gao, F. Yu, and T. Darrell, "End-to-end learning of driving models from large-scale video datasets," arXiv preprint arXiv:1612.01079, 2016.
J. Yang, A. Nakhaei, D. Isele, H. Zha, and K. Fujimura, "CM3: Cooperative Multi-goal Multi-stage Multi-agent Reinforcement Learning," arXiv preprint, 2018.
F. You, R. Zhang, G. Lie, H. Wang, H. Wen, and J. Xu, "Trajectory planning and tracking control for autonomous lane change maneuver based on the cooperative vehicle infrastructure system," Expert Systems with Applications, vol. 42, No. 14, pp. 5932-5946, 2015.
Zhang K., Yang, Z., Liu, H., Zhang, T., and Bas.ar, T. (2018). Fully decentralized multi-agent reinforcement learning with networked agents. arXiv preprint arXiv:1802.08757.
J. Ziegler, P. Bender, T. Dang, and C. Stiller, "Trajectory planning for bertha—a local, continuous method," in Intelligent Vehicles Symposium Proceedings, 2014 IEEE, pp. 450-457, IEEE, 2014.

* cited by examiner

Cooperative multi-goal multi-stage multi-agent reinforcement learning (CM3)

procedure CM3
    for curriculum stage $c = 1$ to 2 do
        if $c = 1$ then
            Set number of agents $N = 1$
            Initialize Stage 1 main networks $V := V_1, \pi := \pi_1$ and target network $V' := V_1'$
        else if $c = 2$ then
            Instantiate $N > 1$ agents
            Construct Stage 2 networks: $V := \{V_1, V_2\}$ and $\pi := \{\pi_1, \pi_2\}$
            Initialize centralized critic network Q, and target networks $V', Q', \pi'$
            Restore values of previously-trained parameters $\theta_{V_1}, \theta_{\pi_1}$
        end if
        Set all target network weights to equal main networks weights
        Initialize exploration parameter $\epsilon = \epsilon_{start}$ and empty replay buffer B
        for each training episode $m = 1$ to M do
            Assign goal(s) $g_m^n$ to agent(s) according to given distribution
            Get initial state $s_1$ and observation(s) $o_1$
            for $t = 1$ to T do
                Sample action $a_t^n \sim \pi(a_t^n | o_t^n; \theta_\pi, \epsilon)$ for each agent.
                Execute action(s) $a_t$, receive reward(s) $\{r_t^n\}, R_t^g$ and next state $s_{t+1}, o_{t+1}$
                Store $(s_t, o_t, g_m, a_t, \{r_t^n\}, R_t^g, s_{t+1}, o_{t+1})$ into B
                Sample minibatch of S transitions $(s_i, o_i, g, a_i, \{r_i^n\} R_i^g, s_{i+1}, o_{i+1})$ from B
                // Execute the following computations for all agents in parallel
                Compute TD target $x_i^n = r_i^n + \gamma V(o_{i+1}, g^n; \theta_V')$
                Update decentralized critic by minimizing $L(\theta_V) = \frac{1}{S} \sum_i (x_i^n - V(o_i, g^n; \theta_V))^2$ Compute policy gradient in local view $$\nabla_{\theta_\pi} J_{local}(\pi) = \frac{1}{S} \sum_i \sum_{n=1}^{N} \sum_{l=1}^{N} \nabla_{\theta_\pi} \log \pi(a_i^l | o_i^l, g^l)(x_i^n - V(o_i, g^n; \theta_V))$$

if $c = 1$ then
                    Update policy: $\theta_\pi \leftarrow \theta_\pi + \beta \nabla_{\theta_\pi} J_{local}$
                else if $c = 2$ then
                    Compute TD target $y_i^n = R_i^g + \gamma Q(s_{i+1}, a_{i+1}^{-n}, a_{i+1}^n, g; \theta_Q')|_{a_{i+1} \sim \pi'}$
                    Minimize loss $L(\theta_Q) = \frac{1}{S} \sum_i (y_i^n - Q(s_i, a_i^{-n}, a_i^n, g; \theta_Q))^2$
                    Compute $A^n(s_i, a_i, g) = Q(s_i, a_i^{-n}, a_i^n, g) - \langle Q(s_i, a_i^{-n}, \cdot, g), \pi(\cdot | o_i^n, g^n) \rangle$
                    Compute policy gradient in global view

FIG. 5A $$\nabla_\theta J_{global}(\pi) = \frac{1}{S} \sum_i \sum_{n=1}^{N} \nabla_\theta \log \pi^n(a^n|o^n, g^n) A^n(s_i, a_i, g)$$

Update policy: $\theta_\pi \leftarrow \theta_\pi + \beta(\alpha \nabla_{\theta_\pi} J_{local} + (1-\alpha)\nabla_{\theta_\pi} J_{global})$
   end if
   Update target network parameters $\theta' \leftarrow \tau\theta + (1-\tau)\theta'$
   $s_t \leftarrow s_{t+1}, o_t \leftarrow o_{t+1}$
  end for
  If $\epsilon > \epsilon_{end}$, then $\epsilon \leftarrow \epsilon - \epsilon_{step}$
 end for
 endfor
endprocedure

FIG. 5B

INTERACTION-AWARE DECISION MAKING

CROSS-REFERENCE TO RELATED APPLICATIONS

This application claims the benefit of U.S. Provisional Patent Application, Ser. No. 62/731,729, filed on Sep. 14, 2018, is a continuation-in-part of U.S. patent application Ser. No. 16/103,847, filed on Aug. 14, 2018, which claims the benefit of U.S. Provisional Patent Application, Ser. No. 62/571,717, filed on Oct. 12, 2017, and is a continuation-in-part of U.S. patent application Ser. No. 16/193,291, filed on Nov. 16, 2018; the entirety of the above-noted application(s) is incorporated by reference herein.

BACKGROUND

Efficient exploration in reinforcement learning may be difficult in a multi-agent setting, where the state space and joint action space scale exponentially with the number of agents. Relying on random exploration to learn both individual task completion and cooperative behavior concurrently may be highly inefficient. Agents who have not yet learned to accomplish local goals may rarely encounter the region of state space where cooperation is needed, rendering any exploration actions useless for learning cooperative behavior. On the other extreme, exploratory actions taken in situations that require coordination may lead to failure, and the resulting penalties may cause agents to avoid the coordination problem altogether and fail to learn their individual tasks.

BRIEF DESCRIPTION

According to one aspect, a method for interaction-aware decision making may include training a first agent based on a first policy gradient and training a first critic based on a first loss function to learn one or more goals in a single-agent environment, where the first agent is the only agent present, using a Markov decision process. The first agent may be associated with a first agent neural network and the first critic may be associated with a first critic neural network. The method for interaction-aware decision making may include training a number N of agents based on the first policy gradient and training a second policy gradient and a second critic based on the first loss function and a second loss function to learn one or more of the goals in a multi-agent environment including the first agent and the N number of agents using a Markov game to instantiate a second agent neural network. Each one of the N number of agents may be associated with a driver type indicative of a level of cooperation for the respective agent. The method for interaction-aware decision making may include generating a multi-goal, multi-agent, multi-stage, interaction-aware decision making network policy based on the first agent neural network and the second agent neural network.

The driver type may be cooperative or competitive. During training of the N number of agents in the multi-agent environment, an agent of the N number of agents may change driver type mid-training.

Each of the first agent and the N number of agents may be associated with a lane priority level based on a position of the respective agent and a layout of the multi-agent environment. During the training of the number N of agents, when a collision occurs between two or more of the agents of the multi-agent environment, a negative reward or a penalty may be assigned to the respective agents involved with the collision based on the lane priority level of respective agents.

The method for interaction-aware decision making may include determining a mask to be applied to a subset of a set of possible actions for the first agent for a time interval based on a layout of the multi-agent environment or positioning of the first agent and the N number of agents and training the first agent based on a remaining set of actions by excluding the masked set of actions from the set of possible actions. The set of possible actions may include a no-operation action, an acceleration action, a deceleration action, a brake release action, a shift left one sub-lane action, or a shift right one sub-lane action.

The first critic may be a decentralized critic and the second critic may be a centralized critic. Training of the first agent in the single-agent environment may occur prior to training the N number of agents in the multi-agent environment. The method for interaction-aware decision making may include training the N number of agents based on a combined policy gradient derived from the first policy gradient and the second policy gradient.

According to one aspect, a system for interaction-aware decision making may include a processor, a memory, and a simulator implemented via the processor and memory. The simulator may perform training a first agent based on a first policy gradient and training a first critic based on a first loss function to learn one or more goals in a single-agent environment, where the first agent is the only agent present, using a Markov decision process. The first agent may be associated with a first agent neural network and the first critic may be associated with a first critic neural network. The simulator may train a number N of agents based on the first policy gradient and training a second policy gradient and a second critic based on the first loss function and a second loss function to learn one or more of the goals in a multi-agent environment including the first agent and the N number of agents using a Markov game to instantiate a second agent neural network. Each of the first agent and the N number of agents may be associated with a lane priority level based on a position of the respective agent and a layout of the multi-agent environment. During the training of the number N of agents, when a collision occurs between two or more of the agents of the multi-agent environment, a negative reward or a penalty may be assigned, by the simulator, to the respective agents involved with the collision based on the lane priority level of respective agents. The simulator may generate a multi-goal, multi-agent, multi-stage, interaction-aware decision making network policy based on the first agent neural network and the second agent neural network.

Each one of the N number of agents may be associated with a driver type indicative of a level of cooperation for the respective agent. The driver type may be cooperative or competitive.

The system for interaction-aware decision making may include a Q-Masker determining a mask to be applied to a subset of a set of possible actions for the first agent for a time interval based on a layout of the multi-agent environment or positioning of the first agent and the N number of agents. The simulator may train the first agent based on a remaining set of actions by excluding the masked set of actions from the set of possible actions. The set of possible actions may include a no-operation action, an acceleration action, a deceleration action, a brake release action, a shift left one sub-lane action, or a shift right one sub-lane action.

The first critic may be a decentralized critic and the second critic may be a centralized critic. The simulator may train the first agent in the single-agent environment occurs prior to training the N number of agents in the multi-agent environment. The simulator may train the N number of agents based on a combined policy gradient derived from the first policy gradient and the second policy gradient. The system for interaction-aware decision making may include a communication interface transmitting the multi-goal, multi-agent, multi-stage, interaction-aware decision making network policy to a server or a vehicle.

According to one aspect, a vehicle for interaction-aware decision making may include a controller, one or more vehicle systems, and a vehicle communication interface. The controller may include a processor and a memory. The vehicle communication interface may receive a multi-goal, multi-agent, multi-stage, interaction-aware decision making network policy. The controller may operates one or more of the vehicle systems of the vehicle according to the multi-goal, multi-agent, multi-stage, interaction-aware decision making network policy. The multi-goal, multi-agent, multi-stage, interaction-aware decision making network policy may be generated by training a first agent based on a first policy gradient and training a first critic based on a first loss function to learn one or more goals in a single-agent environment, where the first agent may be the only agent present, using a Markov decision process at a first stage and training a number N of agents based on the first policy gradient and training a second policy gradient and a second critic based on the first loss function and a second loss function to learn one or more of the goals in a multi-agent environment including the first agent and the N number of agents using a Markov game to instantiate a second agent neural network at a second stage. The first agent may be associated with a first agent neural network and the first critic may be associated with a first critic neural network. Each one of the N number of agents may be associated with a driver type indicative of a level of cooperation for the respective agent. The multi-goal, multi-agent, multi-stage, interaction-aware decision making network policy may be generated based on the first agent neural network and the second agent neural network.

BRIEF DESCRIPTION OF THE DRAWINGS

FIGS. 5A-5B is an exemplary flow diagram of a method for cooperative multi-goal, multi-agent, multi-stage reinforcement learning, according to one aspect.

DETAILED DESCRIPTION

Figure 1:
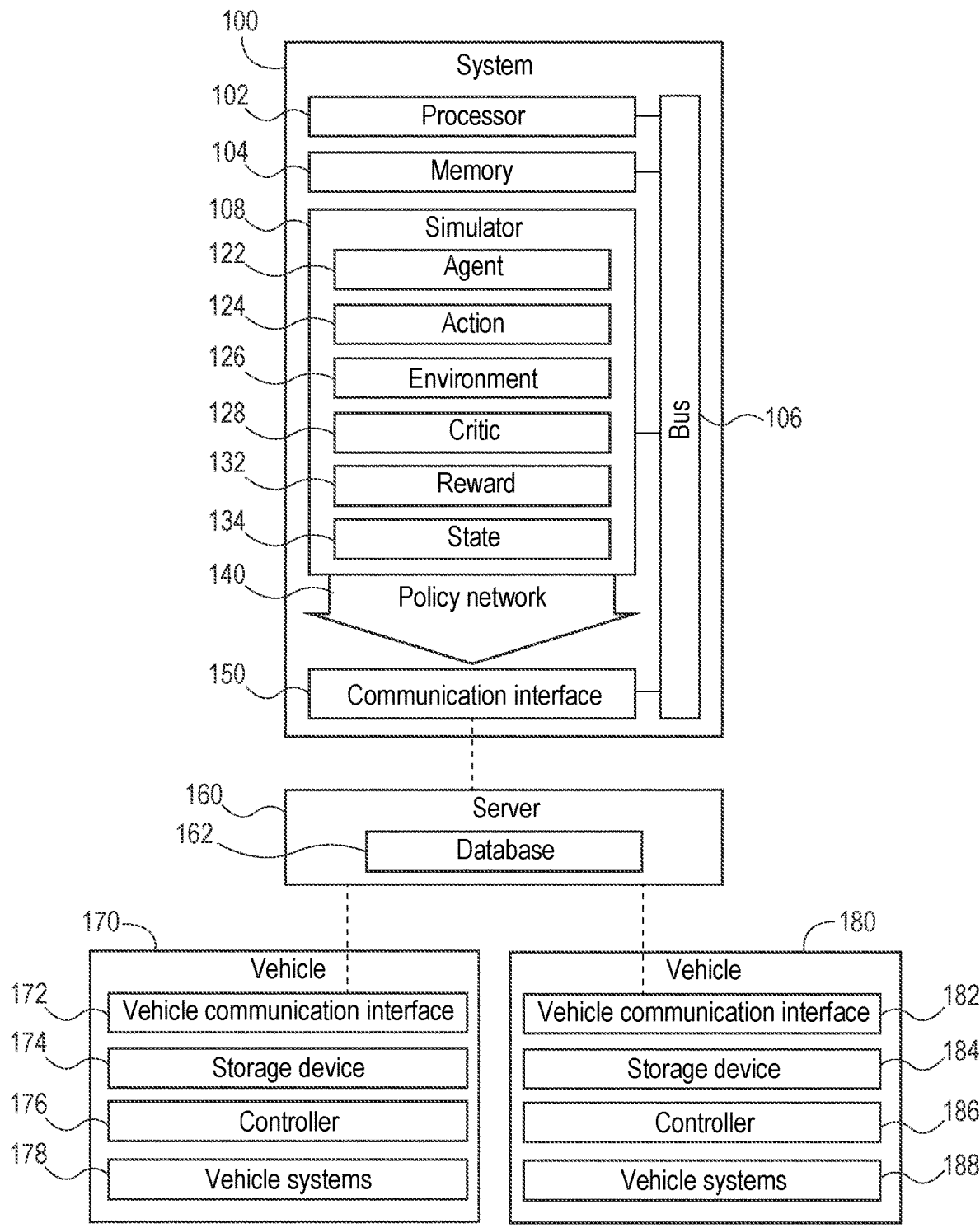
FIG. 1 is an exemplary component diagram of a system for cooperative multi-goal, multi-agent, multi-stage (CM3) reinforcement learning, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted, or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "vehicle", as used herein, may refer to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

An "agent", as used herein, may refer to a "vehicle", such as a vehicle within a simulation or a simulated vehicle. Similarly, "actor" as used herein, may be used interchangeably with "agent". Additionally, "setting" as used herein, may be used interchangeably with "environment". A, "feature" as used herein, may include a goal.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system (LKAS), a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Figure 3:
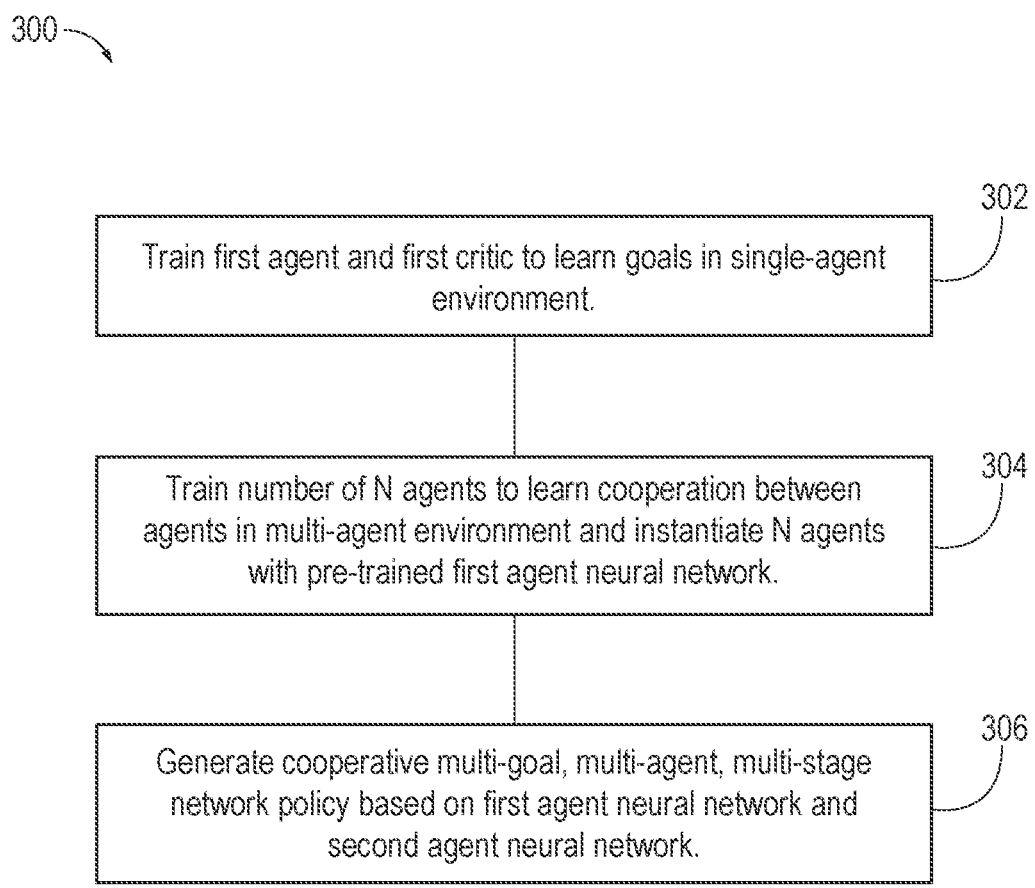
FIG. 3 is an exemplary flow diagram of a method for cooperative multi-goal, multi-agent, multi-stage reinforcement learning, according to one aspect.

As used herein, "CM3" may refer to the use of a method for cooperative multi-goal, multi-agent, multi-stage reinforcement learning or a system for cooperative multi-goal, multi-agent, multi-stage reinforcement learning, including but not limited to the system of FIG. 1, the method of FIG. 3, the method of FIGS. 5A-5B, etc.

An agent may take actions (which may be simulated actions) from a set of possible actions. The set of possible actions may be known as the action set (A).

An environment may be a simulation environment or the world through which the agent moves.

A reward function (R) may be a function that evaluates a taken, (e.g., simulated) action.

A discount factor ($\gamma$) may be multiplied with future rewards to make short-term decisions weigh more than long-term rewards.

A value (V) may be an expected long-term return which includes the effect of the discount factor.

A Q-value (Q) may be an action value which is indicative of the long-term return of an action (a) under policy ($\pi$) on state (s).

A trajectory may be a sequence of states and/or actions which include those states.

A policy ($\pi$) may be a strategy employed to determine the next action for the agent based on the current state.

FIG. 1 is an exemplary component diagram of a system 100 for cooperative multi-goal, multi-agent, multi-stage (CM3) reinforcement learning, according to one aspect. The system 100 for CM3 reinforcement learning may include a processor 102, a memory 104, a bus 106, and a simulator 108. The simulator 108 may be implemented via the processor 102 and the memory 104. The simulator 108 may simulate or perform simulation associated with one or more agents 122, taking one or more actions 124, within a simulation environment 126, where one or more critics 128 interpret or evaluate one or more of the actions 124 taken by one or more of the agents 122 to determine one or more rewards 132 and one or more states 134 resulting from the actions taken.

The simulator 108 or the processor 102 may generate a CM3 policy network 140, which may be stored on the memory 104 of the system 100 for CM3 reinforcement learning. The system may further include a communication interface 150 which enables the CM3 policy network 140 to be transmitted to other devices, such as a server 160, which may include a CM3 database 162. In this way, the CM3 policy network 140 generated by the system 100 for CM3 reinforcement learning may be stored on the CM3 database 162 of the server 160.

The server 160 may then propagate the CM3 policy network 140 to one or more vehicles, such as a first vehicle 170 and a second vehicle 180. The first vehicle may be equipped with a vehicle communication interface 172, a storage device 174, a controller 176, and one or more vehicle systems 178. The storage device may store the CM3 policy network 140 from the server 160, and the controller may operate the first vehicle in an autonomous fashion based on the CM3 policy network 140. Similarly, the second vehicle 180 may be equipped with a vehicle communication interface 182, a storage device 184, a controller 186, and one or more vehicle systems 188, and may operate similarly to the first vehicle.

In any event, when the CM3 policy network 140 is stored on the storage device of the vehicle, this enables the controller to autonomously drive the vehicle around based on the CM3 policy network 140, and to make autonomous driving decisions according to the CM3 reinforcement learning which occurred within the simulator 108 because the CM3 policy network 140 may be indicative of one or more of the policies or decisions which should be made based on the training or the simulation. For example, the CM3 network policy may receive an input of an observation associated with the first autonomous vehicle or the second autonomous vehicle (e.g., a vehicle state or an environment state) and output a suggested action.

Figure 2:
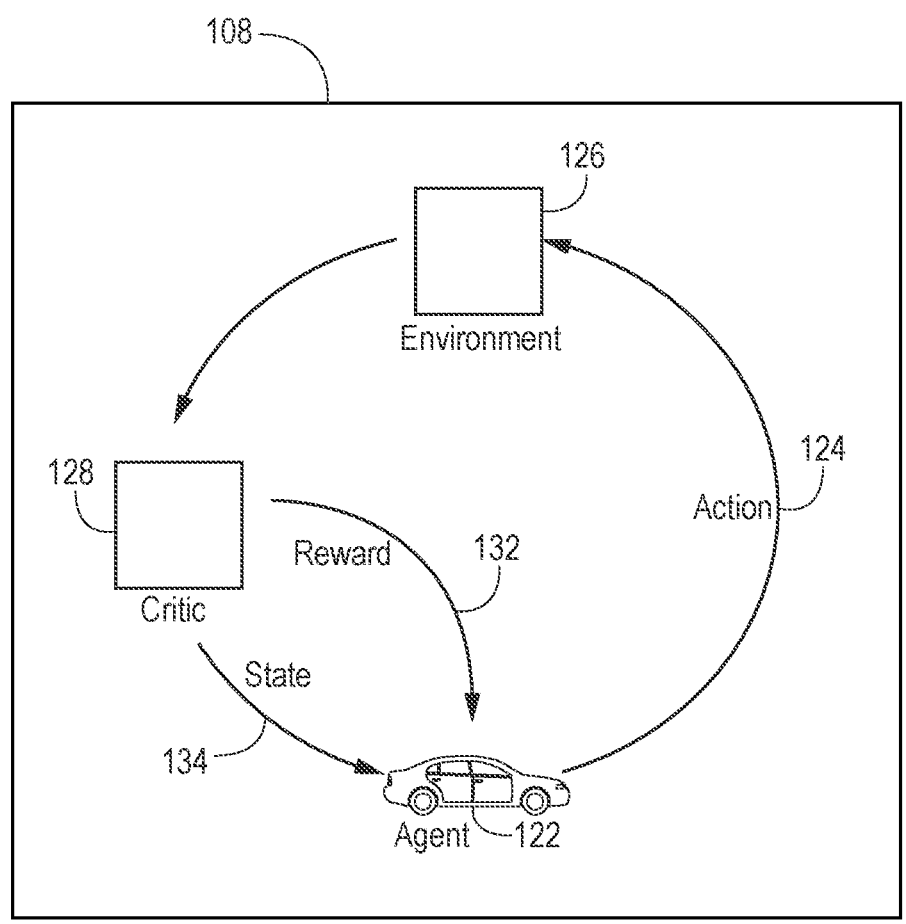
FIG. 2 is an exemplary component diagram of a simulator for the system for cooperative multi-goal, multi-agent, multi-stage reinforcement learning of FIG. 1.

FIG. 2 is an exemplary component diagram of the simulator 108 for the system 100 for cooperative multi-goal, multi-agent, multi-stage reinforcement learning of FIG. 1. In FIG. 2, the simulator 108 of the system 100 for CM3 reinforcement learning of FIG. 1 may be seen. Here, the agent may take the action in the environment. This may be interpreted, by the critic, as the reward or penalty and a representation of the state, which may be then fed back into the agent. The agent may interact with the environment by taking the action at a discrete time step. At each time step, the agent may receive an observation which may include the reward. The agent may select one action from a set of available actions, which results in a new state and a new reward for a subsequent time step. The goal of the agent is generally to collect the greatest amount of rewards possible.

Stage One/Local View/Single-Agent Environment

According to one aspect, the simulator 108 may perform stage one training including training a first agent based on a first policy gradient and a training first critic based on a first loss function to learn one or more features in a single-agent environment using a Markov decision process (MDP). During the first stage or stage one, the simulator 108 may train the agent to achieve one or more individual tasks or to achieve different goals in a single-agent setting or environment (i.e., where there are no other agents within the environment). This may be a static environment. The single-agent setting or environment provided by the simulator 108 in stage one enables the first agent to learn or be trained on the one or more features in an expedient fashion. In other words, by reducing the number of agents in the first stage, the first agent may be trained in a faster, more efficient manner. Explained yet another way, agents that achieve local objectives in the absence of other agents may more reliably produce the desired state configurations for learning cooperative behavior.

The simulator 108 may train the first agent by enabling the first agent to select an action from a set of one or more actions including a no-operation action, an acceleration action, a deceleration action, a shift left one sub-lane action, and a shift right one sub-lane action.

Examples of one or more of the features which may be learned in stage one by the first agent may include learning rules and regulations of the roadway, how to drive on a roadway within the speed limit or maintain speed, how to maintain the vehicle within the lane, how to change lanes or change sub-lane positions, how to exit on an exit ramp, how to enter an on-ramp, etc.

In this way, the first policy network has a decentralized critic which may learn different features in the single-agent setting or environment. Because the first critic may be the decentralized critic, the first stage or stage one may be associated with a local view or individualized rewards, individualized learning, etc. for the first agent.

Stage Two/Global View/Multi-Agent Environment

According to one aspect, the simulator 108 may perform stage two training including training a number of N number of agents based on the first policy gradient and a second policy gradient and training a second critic based on the first loss function and a second loss function to learn a second set of features, such as cooperation, between the N number of agents in a multi-agent environment using a Markov game to instantiate a second agent neural network. During the stage two training, each one of the N number of agents may be instantiated with the pre-trained first agent neural network. In this way, by instantiating each one of the N number of agents with prior knowledge from the pre-trained first agent neural network, curriculum gain may be implemented via the system 100 for CM3 reinforcement learning. In this regard, the simulator 108 may train the first agent in the single-agent environment may occur prior to training the N number of agents in the multi-agent environment. The simulator 108 may train the number of N number of agents based on a combined policy gradient derived from the first policy gradient and the second policy gradient. The number of N number of agents may include the first agent.

For the Markov game, each agent may thus learn to accomplish one or more goals or features within a finite set, cooperate with other agents for collective success of goals between or among the N number of agents, and act independently with limited local information during the simulation. The simulator 108 may formulate the environments (e.g., the single-agent and the multi-agent environments) as episodic environments, where each agent may be assigned randomly-sampled goals during each training episode. In any event, the simulator 108 may setup the environments as a multi-goal Markov game, and review the actor-critic approach to centralized training of decentralized policies.

With respect to the Markov game, the simulator 108 may define a multi-goal Markov game as a tuple $\langle S, \{O^n\}, \{A^n\}, P, R, G, N, \gamma \rangle$, with N number of agents labeled by $n=[1 \ldots N]$. Each agent may have one goal $g^n \in G$ during each episode. At each time step t, the configuration of agents may be completely specified by a state $s_t \in S$, while each agent n receives a partial observation $o_t^n \in O^n$ and chooses an action $a_t^n \in A^n$. The simulator 108 may set the environment to a next state $s_{t+1}$ due to the joint action $a_t := \{a_t^1 \ldots a_t^N\}$, according to a transition probability $P(S_{t+1}|s_t, a)$: $S \times A^1 \times \ldots \times A^N \times S \rightarrow [0,1]$. Each agent may receive a reward R: $S \times A^n \times G \rightarrow \mathbb{R}$ and the learning task is to find stochastic policies $\pi^n(a^n|o^n, g^n)$: $O^n \times G \times A^n \rightarrow [0,1]$, which condition only on local observations and goals, to maximize $$\mathbb{E}_{s_t \sim p^\pi, a_t \sim \pi} \left[ \sum_{t=0}^{T} \gamma^t \sum_{n=1}^{N} R(s_t, a_t^n, g^n) \right]$$

over horizon T, where is γ a discount factor. As used herein, $a^{-n}$ and $g^{-n}$ may denote the collection of all agents' actions and goals, respectively, except that of agent n; g may denote the collection of all agents' goals; and $(\pi(a|o, g) := \Pi_n \pi^n(a^n|o^n, g^n))$ may denote the joint policy. $\mathbb{E}_\pi[\cdot]$ may represent for $\mathbb{E}_{s \sim p^\pi, a \sim \pi[\cdot]}$, where $\rho^\pi$ is defined as the discounted stationary state distribution under π.

In stage two, the simulator 108 may incorporate the learnings of other undertrained individuals or agents by observing the number of N number of agents using a centralized critic. In other words, the second critic may be the centralized critic. The simulator 108 may command the centralized critic to provide local and/or joint rewards. In this way, centralized learning centralized critic of decentralized policies may be provided. Because the second critic may be the centralized critic, the second stage or stage two may be associated with a global view or cooperation type learning for all of the N number of agents. The global view may be indicative of a flow of traffic for the N number of agents as a whole, while the local view may be indicative of movement, flow, or efficiency of merely the first agent. The global view and/or the local view may be taken from a birds-eye-view or perspective of the environment. Two views of the learning objective, corresponding to agents acting toward their own goal and corresponding to cooperation for the success of other agents may thus be provided by the two stages of simulation by the simulator 108. These two stages may be incorporated into a two-stage (e.g., or additional stages, such as three, four, etc.) curriculum bridged by neural network construction.

Explained yet again, in stage two, cooperation is learned by the number of N number of agents during simulation to achieve different features in a multi-agent setting or environment based on a double critic configuration. For example, the first agent may be trained in the first stage and the first, decentralized critic may facilitate learning of multiple features in the single-agent setting or environment. In the second stage, or stage two, the number of N number of agents may be instantiated into the Markov game, and equipped with the pre-trained π1 (e.g., the previously trained parameters from the stage one first agent) and Vπ (e.g., the previously trained parameters from the stage one first, decentralized critic) and the new centralized critic Q (e.g., the second critic).

During the second stage or stage two, the simulator 108 may train the N number of agents to achieve one or more cooperative tasks or to achieve different goals in the multi-agent setting or environment. This may be a dynamic environment. The multi-agent setting or environment provided by the simulator 108 in stage two may enable the N number of agents to learn to interact with one another, while enabling each one of the N number of agents to ultimately achieve their goals of reaching their target locations, respectively.

The simulator 108 may train the N number of agents by enabling each one of the N number of agents to select an action from a set of one or more actions including a no-operation action, an acceleration action, a deceleration action, a shift left one sub-lane action, and a shift right one sub-lane action, similarly to the first agent.

Examples of one or more of the features which may be learned in stage two by the N number of agents may include learning to avoid collisions with other agents, optimizing times to target locations. However, because the learning which occurred in stage one (e.g., learning how to drive in the static environment) is carried over, or instantiated into the simulation of stage two, learning may be achieved at a faster rate than if no division of stage one and stage two were provided by the simulator 108. According to one aspect, the one or more features learned in the single-agent environment of stage one may be different than the features learned in the multi-agent environment of stage two. In this way, the simulator 108 may instantiate the features learned from the first stage to the N number of agents of the second stage to facilitate curriculum learning.

As previously discussed, in stage two, the simulator 108 may incorporate the learnings of other undertrained individuals or agents by observing the number of N number of agents using the centralized critic. Because each of the N number of agents may be instantiated with the teachings (e.g., network policies) from the first stage or stage one, each one of the N number of agents may be pre-trained on how to drive around in the static environment. Further, because there may be the number of N number of agents, each one of the N number of agents may be placed in different locations within the multi-agent environment, and be exposed to different scenarios. By having the simulator 108 and critic observe the number of N number of agents, learning for different scenarios may occur in parallel. Stated another way, the learning which may occur in stage two may be achieved by sharing data learned by a first agent with a second agent and vice versa (e.g., sharing data learned by the second agent with the first agent).

For example, if a first agent is trying to make a left lane change and is positioned in front of a second agent trying to make a right lane change, each one of the agents is being exposed to a different scenario, and network policies may be updated for both, thereby enhancing the efficiency of the learning, greatly reducing the amount of training time associated with training a CM3 system. In this example, the first agent and the second agent have different goals (e.g., a first goal of performing the left lane change and a second goal of performing the right lane change, perhaps to gain access to an exit ramp). It should be noted that cooperation learning may be implemented by the simulator 108. For example, if the first agent refused to allow the second agent to perform the right lane change and if the second agent refused to allow the first agent to perform the left lane change, a stalemate scenario may occur, benefiting neither agent.

The second agent neural network may be associated with an $o_{others}$ parameter for each of the N number of agents indicative of a local observation of each of the corresponding N number of agents. According to one aspect, the $o_{others}$ parameter may be indicative of a velocity of the first agent, a number of lanes or sub-lanes between the first agent and one of the N number of agents, a distance from the first agent to a goal position, or a vehicle type associated with the first agent. The $o_{others}$ parameter may be indicative of a vehicle occupancy status associated with one of the N number of agents, a relative velocity of one of the N number of agents relative to the first agent, or a vehicle type associated with one of the N number of agents.

Although, a third stage or stage three is not described herein, it is contemplated that in the third stage, each one of the N number of agents may be instantiated, by the simulator 108, with the pre-trained first agent neural network and the pre-trained second agent neural network and additional learning may occur, thereby enabling curriculum learning to be provided.

Policy Generation/Centralized Learning of Decentralized Policies

The processor 102 or the simulator 108 may generate a CM3 network policy based on the first agent neural network and the second agent neural network. The simulator 108 may bridge the two stages (e.g., stage one and stage two) by modular augmentation of neural network policy and value functions. The CM3 network policy may be indicative of data which may be utilized to direct the controller of the autonomous vehicle(s) of FIG. 1 to operation in an autonomous fashion. For example, the CM3 network policy may receive an input of an observation associated with the first autonomous vehicle or the second autonomous vehicle (e.g., a vehicle state or an environment state) and output a suggested action, which may include the no-operation action, the acceleration action, the deceleration action, the shift left one sub-lane action, and the shift right one sub-lane action, similarly to the actions used during simulation and provided by the simulator 108.

The CM3 network policy may be indicative of a combined view which is representative of the local view and the global view associated with the first stage and the second stage. According to one aspect, the simulator 108 may optimize the CM3 network policy based on the local view and the global view. In this way, a two-stage curriculum, including a single-agent stage for learning to accomplish individual tasks, followed by a multi-agent stage for learning to cooperate in the presence of other agents may be provided. The simulator 108 may bridge these two stages (e.g., the first stage and the second stage) by modular augmentation of neural network policy and value functions from the first stage and the second stage, respectively. In other words, the simulator 108 may modularly augment the neural network policy associated with the first stage or stage one with the neural network policy associated with the second stage or stage two. Similarly, the simulator 108 may modularly augment one or more value functions associated with the first stage or stage one with one or more value functions associated with the second stage or stage two.

As previously discussed, CM3 may implement an actor-critic or agent-critic framework to this curriculum by formulating local and global views of the policy gradient and learning, via a double critic, including a decentralized value function (e.g., associated with the first, decentralized critic) and a centralized action-value function (e.g., associated with the second, centralized critic). The simulator 108 may thus simulate both a single-agent setting and a multi-agent setting where each agent learns to accomplish goals or features within a finite set and cooperate with other agents with potentially different goals or features. In this regard, the CM3 framework of the method for cooperative multi-goal, multi-agent, multi-stage reinforcement learning or the system 100 for cooperative multi-goal, multi-agent, multi-stage reinforcement learning enables a multi-agent curriculum to provide one or more benefits or advantages.

For example, multi-agent exploration has previously been a difficult problem to tackle. By training a stage one network policy to achieve different goals in a single-agent setting, exploratory actions useful for finding cooperative solutions may be achieved after agents are setup to reliably generate conflict by acting toward individual goals learned in the single-agent setting.

As another example, a neural network construction for multi-agent reinforcement learning (MARL) may be provided. Specifically, stage one training for the agent or the actor and critic neural networks may be simplified by setting the associated input space to a part (e.g., this may be pre-defined, pre-programmed, set manually, etc. to a first set of goals or features) that is sufficient for achieving individual goals in the single-agent environment. In the stage two neural network construction, the architecture may be augmented, adjusted, or modified for further learning in the full multi-agent environment or based on the stage one training (e.g., stage one variables, parameters, neural networks, etc.). This enables decomposition of an agent's observation into a representation of the agent's own state (e.g., distance to a target location), and a representation of other agents.

Additionally, stage one and stage two are combined. In other words, a decentralized policy is trained using a double critic, including a decentralized value function for learning local objectives and a centralized action-value function for learning cooperation, thereby enabling local objectives or goals to be considered while also considering cooperation between N number of agents by showing two equivalent views of the policy gradient and implementing the new actor-critic or agent-critic adaptation.

The CM3 framework (e.g., associated with the CM3 system and CM3 method) combines these features within a single curriculum including a simplified policy network with a decentralized critic to learn to achieve multiple goals in stage one, while stage two augments the policy's observation space to represent other agents and learns multi-agent cooperation using the double critic implementation. According to one aspect, parameter-sharing may be provided among one or more to all of the agents by the simulator 108.

A centralized critic receiving full state-action information may speed up learning of decentralized actors or agents (e.g., policies) that receive only local information, and only the actors may be retained for execution after training. According to one aspect, in a single-agent setting, policy $\pi$ (with parameter $\theta$ may maximize the objective $J(\pi)$: $\mathbb{E}_\pi[\Sigma_t \gamma^t R(s_t)]$ by ascending the gradient:

$$\nabla_\theta J(\pi) = \mathbb{E}_\pi[\nabla_\theta \log \pi(a|s)(Q^\pi(s,a) - b(s))] \quad (1)$$

In equation (1)

$$Q^\pi(s, a) := \mathbb{E}_{s_t \sim p^\pi, a_t \sim \pi}\left[\sum_t \gamma^t R(s_t, a_t) \middle| s_0 = s, a_0 = a\right]$$

is the action-value function, and $b(s)$ is any state-dependent baseline.

According to one aspect, a counterfactual baseline may be defined as:

$$b(s, a^{-n}) := \Sigma_{\hat{a}^n} \pi^n(\hat{a}^n | o^n) Q(s, (a^{-n}, \hat{a}^n)) \quad (2)$$

The counterfactual baseline may address the issue of multi-agent credit assignment: Q (s, $(a^{-n}, a^n)$)−b(s, $a^{-n}$) may represent the contribution of an agent's chosen action and versus the average of all possible counterfactual actions $\hat{a}^n$, keeping other agents' actions fixed. The simulator 108 may employ parameter-sharing among all agents, meaning that all agents execute the same policy but may behave differently according to their individual observations.

The policy gradient may be defined as:

$$\nabla_\theta J(\pi) = \mathbb{E}_\pi[\Sigma_n \nabla_\theta \log \pi^n(a^n|o^n)(Q(s,a) - b(s,a^{-n})] \quad (3)$$

The CM3 framework described herein may be based on the counterfactual baseline (e.g., equation (3)) that accounts for individual objectives and mixtures of local and joint rewards.

FIG. 3 is an exemplary flow diagram of a method 300 for cooperative multi-goal, multi-agent, multi-stage reinforcement learning, according to one aspect. The method 300 may include training 302 a first agent and a first critic to learn features in a single-agent environment, training 304 a number of N number of agents to learn cooperation between N number of agents in a multi-agent environment, instantiating N number of agents with a pre-trained first agent neural network, and generating 306 a cooperative multi-goal, multi-agent, multi-stage (CM3) network policy based on the first agent neural network and the second agent neural network. Therefore, the acts of training 302 and training 304 including an incremental, multi-stage learning process to build the network policy of 306.

According to one aspect, the training 302 of the first agent in the single-agent environment may include training the first agent based on a first policy gradient and training a first critic based on a first loss function to learn one or more features in the single-agent environment using a Markov decision process. The first agent may be associated with a first agent neural network and the first critic may be associated with a first critic neural network. The first critic may be a decentralized critic.

According to one aspect, the training 304 of the N number of agents in the multi-agent environment may include training the number of N number of agents based on the first policy gradient and a second policy gradient and a second critic trained based on the first loss function and a second loss function to learn cooperation between the N number of agents in a multi-agent environment using a Markov game to instantiate a second agent neural network. Each of the N number of agents may be instantiated with the first agent neural network in a pre-trained fashion. The second critic may be a centralized critic. In this way, a double critic method may be provided. Further, training the first agent in the single-agent environment may occur prior to training the N number of agents in the multi-agent environment, thereby enhancing the efficiency of the CM3 reinforcement learning, as will be described herein.

Figure 4:
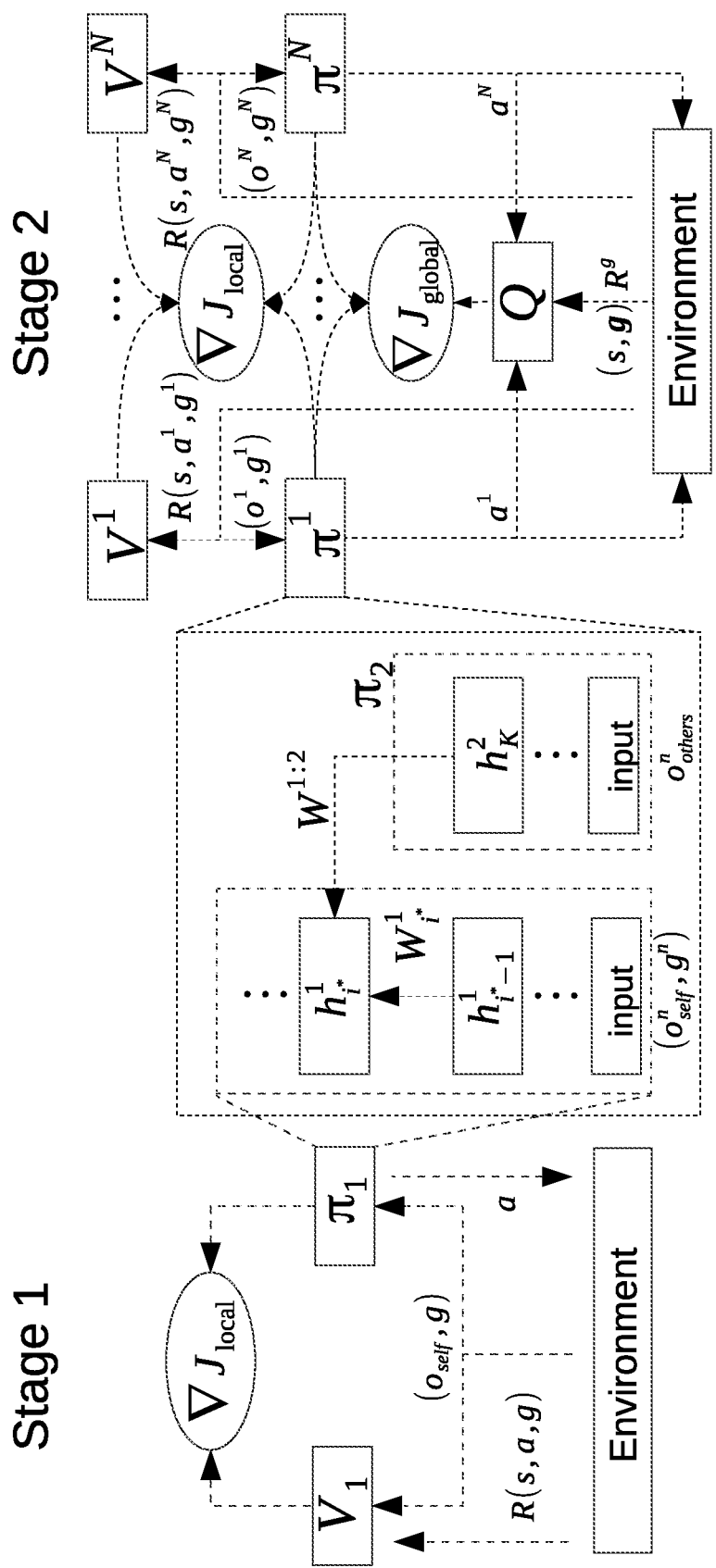
FIG. 4 is an exemplary data flow diagram in association with a method for cooperative multi-goal, multi-agent, multi-stage reinforcement learning, according to one aspect.

FIG. 4 is an exemplary data flow diagram in association with a method for cooperative multi-goal, multi-agent, multi-stage reinforcement learning, according to one aspect. In stage one of FIG. 4, a pair of reduced networks $V_1$ and $\pi_1$ may learn to achieve multiple goals in a single-agent environment, using policy gradient $\nabla J_{local}$. A new policy network $\pi$ may be constructed from the trained $\pi_1$, a new module $\pi_2$, and construction for V. In the full multi-agent environment of stage two of FIG. 4, these larger $\pi$ and V may be instantiated for each of the N number of agents (with full parameter-sharing), along with a new centralized critic Q, and trained using the interpolated policy gradient.

A joint policy $\pi(a|o, g)$ with implied parameter $\theta$ shared by all individual $\pi^n(a^n|o^n, g^n)$ may be defined to maximize the objective:

$$J(\pi) := \mathbb{E}_\pi[\Sigma_t \gamma^t \Sigma_{n=1}^N R(s_t, a_t^n, g^n)] \quad (4),$$

The objective may be viewed in two ways (e.g., local and global), leading to the actor-critic pair of decentralized and centralized critics.

For the local view (e.g., first view), the simulator 108 may learn a decentralized critic from these rewards to provide a policy gradient for agents to achieve local goals without explicit regard to the joint success of all agents. Objectives $J_n(\pi) := \mathbb{E}_\pi[\Sigma_t \gamma^t R(s_t, a_t^n, g^n)]$ may be defined to correspond to individual goals $g^n$. $J_{local}$ may be maximized by ascending the gradient:

$$\nabla_\theta J_{local}(\pi) = \Sigma_{n=1}^N \nabla_\theta J_n(\pi) = \mathbb{E}_\pi[\Sigma_{n=1}^N \log \pi(a|o,g) Q_n^\pi(s,a)]$$

$$\approx \mathbb{E}_\pi[\nabla_\theta \Sigma_{n=1}^N \log \pi(a|o,g)(R(s_t,a_t^n,g^n) - V^\pi(o_t,g^n))] \quad (5)$$

Each $Q_n^\pi(s,a) := \mathbb{E}_\pi[\Sigma_t \gamma^t R(s^t, a_t^n, g^n)|s_0=s, a_0=a)]$ is the state-action value corresponding to the individual reward $R(s, a^n, g^n)$.

In the second line of equation (5), the following approximations may be made:

1) for scalability, approximate all $Q_n^\pi(s,a)$ by a single $Q^\pi(s, a, g^n)$ with an additional input goal $g^n$, instead of using n different function approximators;

2) without changing the expectation, replace $Q^\pi(s,a,g^n)$ with the advantage function $A^\pi(s,a,g^n) := Q^\pi(s,a,g^n) - Q^\pi(s,a,g^n)$, and use the TD error $\delta_t^n := R(s_t, a_t^n, g^n) + \gamma V^\pi(s_{t+1}, g^n) - V^\pi(s_t, g^n)$ as an unbiased estimate of the advantage value;

3) calculated the decentralized critic $V(o_t, g^n)$ by making a final approximation of $s_t$ with $o_t$.

Parameterized by $\theta_V$, the critic is updated by minimizing the loss:

$$\mathcal{L}(\theta_V) = \mathbb{E}_{s_t, a_t^n, s_{t+1}}[(R(s_t, a_t^n, g^n) + \gamma V(o_{t+1}, g^n; \theta_V') - V(o_t, g^n; \theta_V))^2] \quad (6)$$

where $\theta'_V$ are parameters of a target network that slowly updates towards the main $\theta_V$.

For the global view (e.g., second view), a joint reward $R^g(s,a,g) := \Sigma_{n=1}^N R(s, an, g^n)$ may be defined. The joint reward may be used to learn a centralized critic that encourages each agent to contribute to other agents' success. $J_{global}$ may be defined as:

$$\nabla_\theta J_{local}(\pi) = \mathbb{E}_\pi[\Sigma_n \nabla_\theta \log \pi^n(a^n|o^n, g^n)(Q^\pi(s,a,g) - b(s,a^{-n},g))] \quad (7)$$

$Q^\pi(s,a,g) = \mathbb{E} \mathbb{E}_\pi[\Sigma_t \gamma^t R^g(s_t, a_t, g)|s_0=s, a_0=a)]$ is the centralized critic and $b(s, a^{-n}, g)$ may be the generalized counterfactual baseline with multiple goals:

$$b(s, a^{-n}, g) := \Sigma_{\hat{a}^n} \pi^n(\hat{a}^n|o^n, g^n) Q^\pi(s, (a^{-n}, \hat{a}^n), g) \quad (8)$$

Parameterized by $\theta_Q$, the centralized critic is updated by minimizing the loss:

$$\mathcal{L}(\theta_Q) = \mathbb{E}_{s_t, a_t, s_{t+1}}[R^g(s_t, a_t, g) + \lambda Q(s_{t+1}, a'_{t+1}, g; \theta'_Q)|a'_{t+1}\pi - Q(s_t, a_t, g; \theta_Q))^2] \quad (9)$$

In equation (9), $\theta'_Q$ and $\pi'$ represent slowly-updating target Q and target policy networks, respectively.

For the combined view (e.g., third view), interpolation between both views using $\alpha \in (0,1)$ may be performed by the simulator 108 to determine the extent that the joint reward affects each agent's policy.

The overall policy gradient is defined as:

$$\theta_\nabla J(\pi) := \alpha \nabla_\theta J_{local}(\pi) + (1-\alpha) \nabla_\theta J_{global}(\pi) \quad (10)$$

The policy gradient may be viewed as a weighted-sum scalarization of a two-objective optimization problem, whose Pareto optima may be found by optimizing along equation (10) using convexity assumptions.

In stage one, an actor $\pi$ and decentralized critic $V^\pi$ may be trained to learn multiple goals in a single-agent setting. This stage may be based on the single-agent Markov decision process (MDP). The simulator 108 may train an actor $\pi(a^n|o^n, g^n)$ and critic $V^\pi(o^n, g^n)$ according to policy gradient $\nabla J_{local}$ equation (5) and loss $\int(\theta_V)$ equation (6), respectively. A goal may be uniformly sampled from G in each training episode, for the agent to learn all goals over the course of training. The simulator 108 may use deep neural networks for function approximation, and the input to the actor and critic networks may include the agent's observation vector $o^n$ and a vector $g^n$ representing the goal for a particular episode.

The simulator 108 may make the simple observation that multi-agent environments typically permit a decomposition of the agent's observation space into $O^n = O_{self}^n \cup O_{others}^n$, where $o_{self} \in O_{self}^n$ contains information about the agent's own state (e.g. position) while $o_{others} \in O_{others}^n$ is the agent's local observation of surrounding agents, and that the ability to process $o_{others}$ is unnecessary in stage one. In this way, the simulator 108 may reduce the size of the input space of $\pi$ and V to be set to $(O_{self}^n, g^n)$, thereby reducing the number of trainable parameters in stage one and enhancing training speed. The simulator 108 may train these reduced actor and critic networks until convergence, label them as $\pi 1$ and $V1$, respectively.

In stage two, the simulator 108 may instantiate all agents into the full Markov game, equipped with the pre-trained $\pi$ and $V^\pi$ and a new centralized critic Q, and conduct further training for cooperative behavior. The Markov game may be instantiated with N number of agents. The simulator 108 may retain the previously-trained $\pi 1$ parameters, instantiate a new neural network $\pi 2$ for agents to process the $o_{others}$ parameter of their local observation, and introduce hidden connections from the output of $\pi 2$ to a selected layer of $\pi 1$. Specifically, $h_i^1 \in \mathbb{R}^{m_i}$ may define the hidden activations of layer $i \leq L$ with $m_i$ units in an L-layer neural network representation of $\pi 1$, connected to layer i–1 via $h_i^1 = f(W_i^1 h_{i-1}^1)$ with $W_i^1 \in \mathbb{R}^{m_i \times m_{i-1}}$ and activation function f. stage two introduces a K-layer neural network $\pi 2$ ($o_{others}$) with output layer $k \in \mathbb{R}^{m_K}$ chooses a particular layer $i^*$ of $\pi_1$, and augments the hidden activations $h_{i^*}^1$ to be:

$$h_{i^*}^1 = f(W_{i^*}^1 h_{i^*-1}^1 + W^{1:2} h_K^2) \quad (11),$$

with $W^{1:2} \in \mathbb{R}^{m_{i^*} \times m_K}$

An equivalent or similar augmentation may be made to critic V1 using a new neural network V2 ($o_{others}$). The simulator 108 may instantiate the centralized critic $Q^\pi(s; a; g)$, which was not required and therefore absent during stage one, and train $\pi; V; Q$ using the combined gradient $\nabla J$ equation (10), loss $\int(\theta_V)$ equation (6) and loss $L(\theta_Q)$ equation (9), respectively. Similarly to stage one, the simulator 108 may assign goals to agents by sampling (e.g., randomly) from a distribution over G during each training episode. The distribution can be constructed to ensure sufficient training on difficult goal combinations that require cooperation, along with easier combinations for maintaining agents' ability to act toward their goal.

This two-stage construction of actor-critic networks with curriculum learning improves learning speed compared to direct training on the full multi-agent environment. In this way, CM3 framework based systems and methods learn significantly faster and find more successful policies than even strong baselines. The two-stage curriculum and the decentralized critic facilitate this success, while the global view of policy gradient gives a noticeable advantage in finding a cooperative solution.

Further hidden layers $i < i^*$ that were pre-trained for processing ($o_{self}^n, g^n$) in stage one retain the ability to process task information, while the new module learns the effect of surrounding agents. Higher layers $i \geq i^*$ that can generate goal-directed actions in the single-agent setting of stage one are fine-tuned by the combined gradient to generate cooperative actions for joint success of all agents.

FIGS. 5A-5B are an exemplary flow diagram of a method for cooperative multi-goal, multi-agent, multi-stage reinforcement learning, according to one aspect. According to one aspect, the method of FIGS. 5A-5B illustrates pseudo-code for implementing a CM3 framework.

Figure 6:
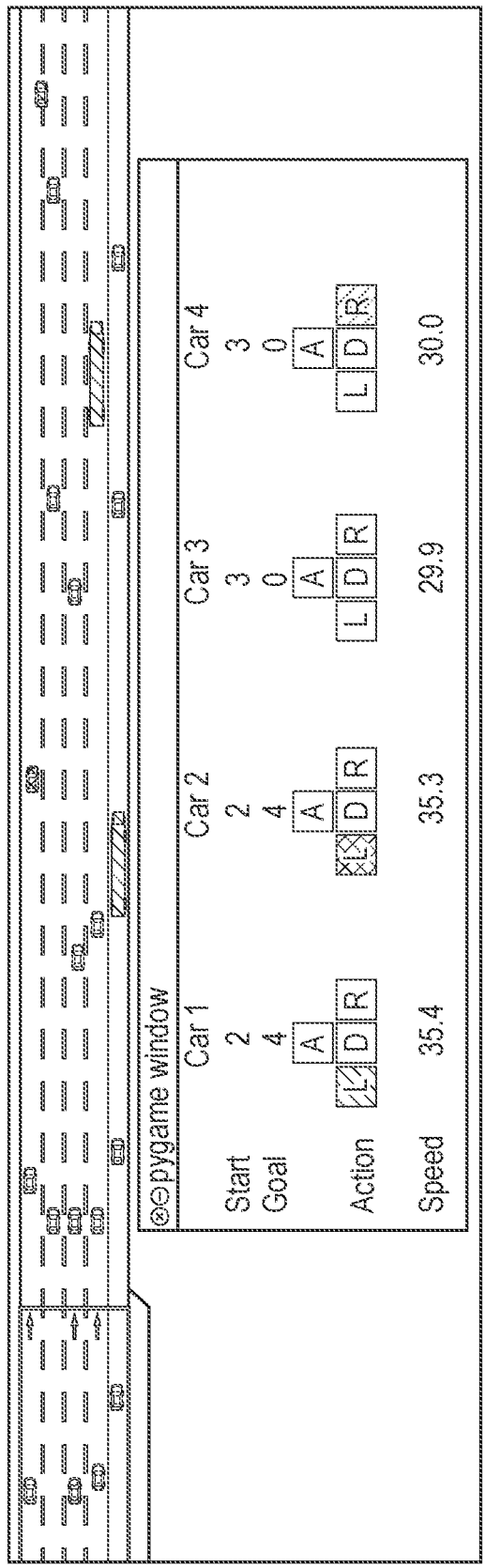
FIG. 6 is an exemplary simulation scenario in association with cooperative multi-goal, multi-agent, multi-stage reinforcement learning, according to one aspect.

FIG. 6 is an exemplary simulation scenario in association with cooperative multi-goal, multi-agent, multi-stage reinforcement learning, according to one aspect. In FIG. 6, one segment of a large road network in the simulator 108 is illustrated. The simulator 108 may include I initial lanes starting at horizontal position $x_i$, two of which encounter a merge point, and I–1 goal lanes at terminal position $x_f$. In each episode, N number of agents are emitted at $x_i$, on randomly selected initial lanes, and each agent n is associated with a randomly-selected goal lane $g^n$ that it should learn to reach at position $x_f$. Agents may receive observations with a limited field of view, choose actions from a discrete action space, and receive rewards according to both terminal and instantaneous criteria (e.g. reached goal, exceeded speed limit). The simulator 108 may define the following environments:

E1: a single agent on an otherwise empty road learns to reach any goal lane from any initial lane. This is used for stage one of CM3, which trains initial networks $\pi 1$ and $V1$ with objective $J_{local}$.

E2: N=4 agents are randomly initialized: with probability 0.8, initial and goal lanes are set so that a double-merge occurs; with probability 0.2, initial and goal lanes are uniformly sampled. The full stage two architecture of CM3 is trained in E2.

E2+: used to test generalization, with the traffic simulator-controlled vehicles emitted with probability 0.5/sec.

According to one aspect, the simulator 108 may train stage one in E1, followed by training of stage two on E2. According to another aspect, competitor methods may be trained directly in E2 (e.g., where vehicles or agents may compete rather than cooperate).

The simulator 108 may be setup to simulate a straight road of a total length, including one or more main lanes and one merge lane. Vehicles on the merge lane may be able to merge onto main lanes within a merge window, and the merge lane may end at a predetermined length. The lanes may have a width, and vehicles may be aligned along any of four sub-lanes within a lane, with a lateral spacing. The speed limit may be set to a predetermined speed. In E2+, the traffic simulator-controlled passenger cars and trucks (e.g., type trailer) that behave according to the Krauß car-following model may be emitted on to main lanes with a predetermined probability per second. Simulation time resolution may be set to a simulation step time.

According to one aspect, in E1, the single agent's initial lane and goal lane may be sampled randomly from uniform distributions over the number of start and end lanes. In E2, with a probability 0:2, all agents' initial and goal lanes may be sampled independently from uniform distributions over the number of start and end lanes; with probability 0:8, agents [1,2,3,4] were initialized with initial lanes [2,2,3,3] and goal lanes [4,4,0,0]. Departure times may be drawn from normal distributions with mean [0; 2; 0; 2]s and standard deviation 0.2 s.

Local Observation

According to one aspect, each agent vehicle's local observation on may include two parameters. The first parameter relating to self, used in all training stages, may be a vector including agent's speed normalized, normalized number of sub-lanes between agent's current sub-lane and center sub-lane of goal lane, normalized longitudinal distance to goal position, binary indicator for being on the merge lane, normalized distance to the next segment along the road (using predefined segment boundaries).

According to another aspect, the second parameter may be a discretized observation grid centered on the agent, with four channels including: binary indicator of vehicle occupancy, normalized relative speed between other vehicle and agent, binary indicator of vehicle type being a passenger car, binary indicator of vehicle type being a truck.

Global State

The global state vectors may be the concatenation $o_{self}^1, \ldots, o_{self}^N$ of all agents' observation parameter $o_{self}^n$.

Goals

Each goal vector $g_n$ may be a one-hot vector of length, indicating the goal lane at which agent n should arrive once it reaches a predetermined position x. Goals may be randomly sampled for all agents during each episode.

Actions

All agents have the same discrete action space, including five options: no-operation action (e.g., maintain current speed and lane), accelerate, decelerate, and shift one sub-lane to the left, shift one sub-lane to the right. Each agent's action $a_n$ may be represented as a one-hot vector of a predetermined length.

Individual Rewards

According to one aspect, the reward $R(s_t, a_t^n, g^n); g^n)$ for agent n with goal $g_n$ may be given according to the conditions:
- −10 for a collision (followed by termination of episode)
- −10 for time-out (exceed 120 simulation steps during episode)
- +10(1−Δ) for reaching the end of the road and having a normalized sub-lane difference of from the center of the goal lane
- −5 for entering the merge lane from another lane during 200 m<x<400 m
- −0.5 for being in the merge lane during 200 m<x<400 m
- −0.1 if current speed exceeds 35.7 m/s Shared Global Reward According to one aspect, a shared global reward $R^g(s_t; a_t; g)$ may be determined by:
- −10 if any collision occurred; and
- the average of all individual rewards of agents who reached the end of the road at time t.

Architecture

According to one aspect, the policy network $\pi_1$ during stage one feeds each of the inputs $o_{self}$ and $g^n$ to one fully-connected layer with 32 units. The concatenation may be fully-connected to a layer $h_*^{\pi_1}$ with 64 units, and fully-connected to a softmax output layer with 5 units, each corresponding to one discrete action. In stage two, the input observation grid $o_{others}$ may be processed by a convolutional layer with 4 filters of size 5×3 and stride 1×1, flattened and fully-connected to a layer with 64 units, then fully-connected to the layer $h_*^{\pi_1}$ of $\pi_1$. ReLU nonlinearity may be used for all hidden layers. Action probabilities are computed by lower-bounding the softmax outputs via $Pr(a^n=i)=(1−\epsilon)$ softmax(i)+ϵ/|A|, where ϵ is a decaying exploration parameter and |A|=5.

The decentralized critic V1, during stage one, may feed each of the inputs $o_{self}$ and $g^n$ to one fully-connected layer with 32 units. The concatenation may be fully-connected to the output linear layer hV1_ with a single unit. In stage two, the input observation grid $o_{others}$ may be processed by a convolutional layer 13 with 4 filters of size 5×3 and stride 1×1, flattened and fully-connected to a layer with 32 units, then fully-connected to the output layer $h_*^{V_1}$ of V1. ReLU nonlinearity may be used for all hidden layers.

The centralized critic Q(s,a,g) may receive input (s, $a^{-n}$, $g^n$, $g^{-n}$, n), which may be connected to two fully connected layers with 128 units and ReLU activation, and fully-connected to a linear output layer with 5 units. The value of each output node i may be interpreted as the action-value Q(s, $a^{-n}$, $a^n=i$, g) for agent n taking action i and all other agents taking action $a^{-n}$. The agent label vector n is a one-hot indicator vector, used as input to differentiate between evaluations of the Q-function for different agents.

Double replay buffers $B_1$ and $B_2$ may be used as a heuristic to improve training stability for all algorithms on stage two. Instead of storing each environment transition immediately, an additional episode buffer may be used to store all transitions encountered during each episode. At the end of each episode, the cumulative reward of all agents may be compared against a threshold (e.g., 32), to determine whether the transitions in the episode buffer should be stored into $B_1$ or $B_2$. For training, half of the minibatch is sampled from each of $B_1$ and $B_2$.

Figure 7:
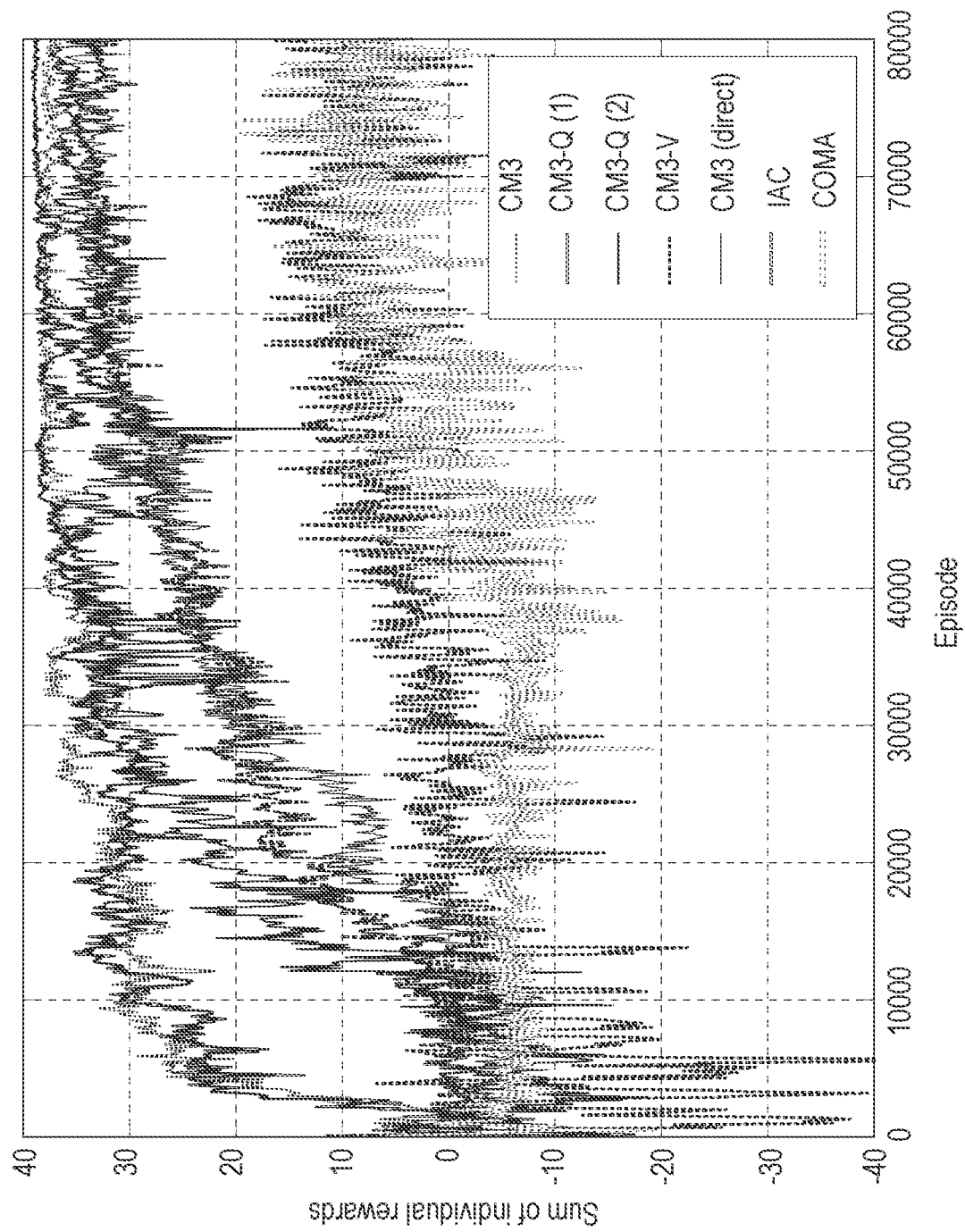
FIGS. 7-8 are exemplary performance results in association with cooperative multi-goal, multi-agent, multi-stage reinforcement learning, according to one aspect.
Figure 8:
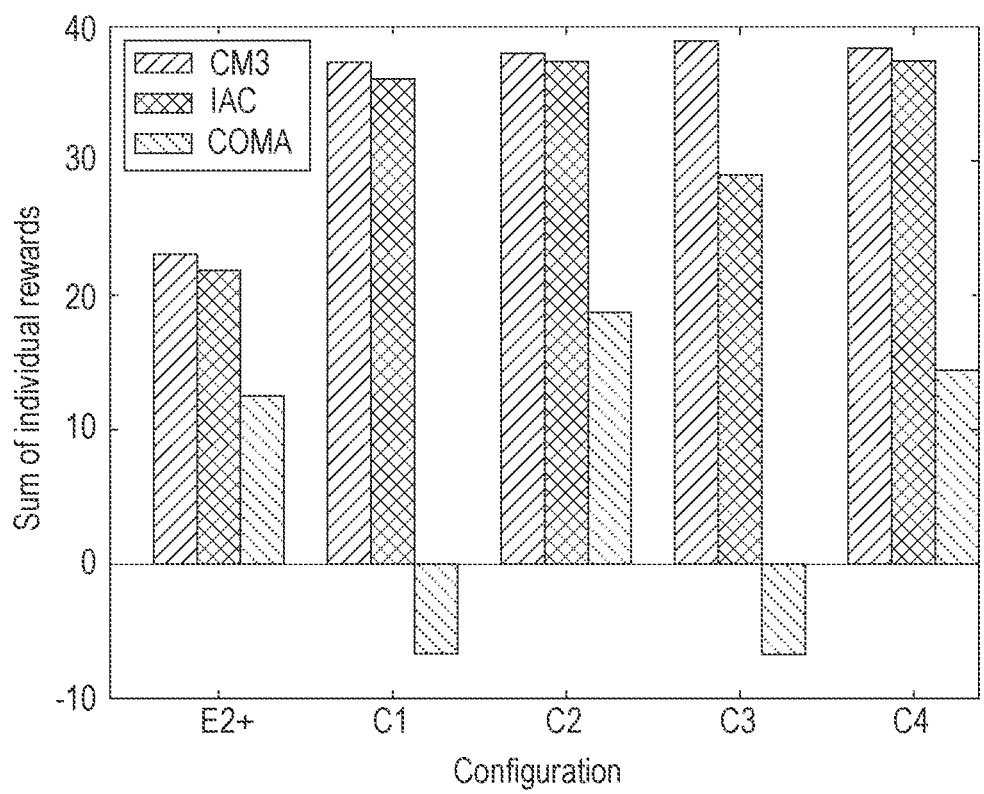

FIGS. 7-8 are exemplary performance results in association with cooperative multi-goal, multi-agent, multi-stage reinforcement learning, according to one aspect. As seen in FIG. 7, CM3 converged to higher performance more than 45 k episodes earlier than other techniques in E2. In FIG. 8, it may be seen that a policy learned by a CM3 framework based system or method generalizes better to E2+.

Figure 9:
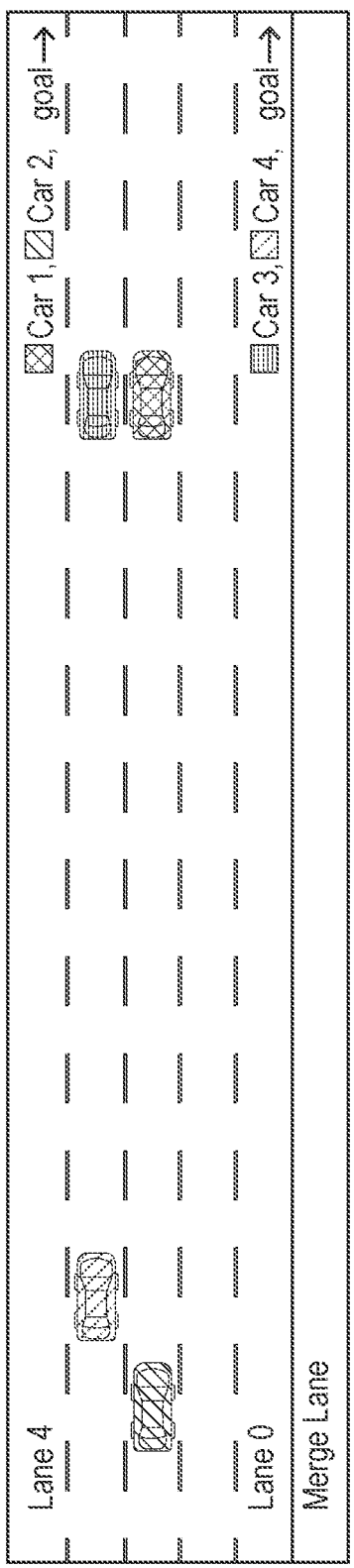
FIG. 9 is an exemplary simulation scenario in association with cooperative multi-goal, multi-agent, multi-stage reinforcement learning, according to one aspect.

FIG. 9 is an exemplary simulation scenario in association with cooperative multi-goal, multi-agent, multi-stage reinforcement learning, according to one aspect. In FIG. 9, an initial lane configuration associated with E2 requires agents to perform a double-merge or a double-lane change to reach their goal lanes.

Figure 10:
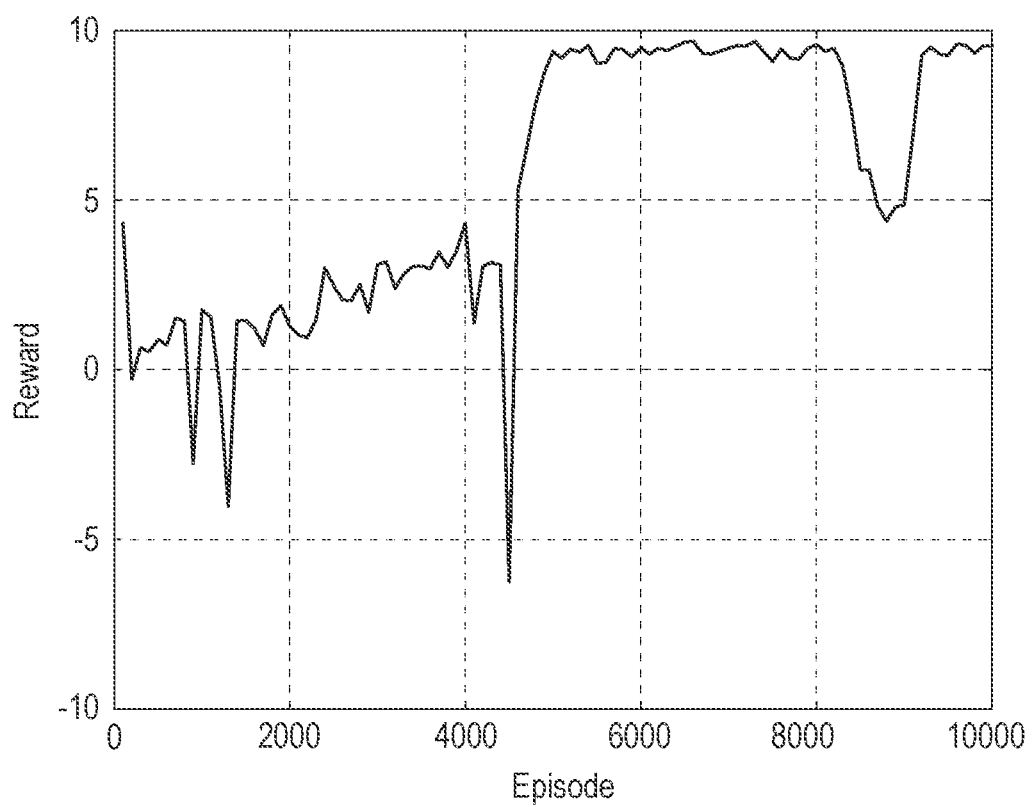
FIG. 10 is an exemplary reward versus episode graph in association with cooperative multi-goal, multi-agent, multi-stage reinforcement learning, according to one aspect.

FIG. 10 is an exemplary reward versus episode graph in the single-agent environment E1, according to one aspect.

Autonomous Vehicle Policy Generation Based on Masking

Figure 11:
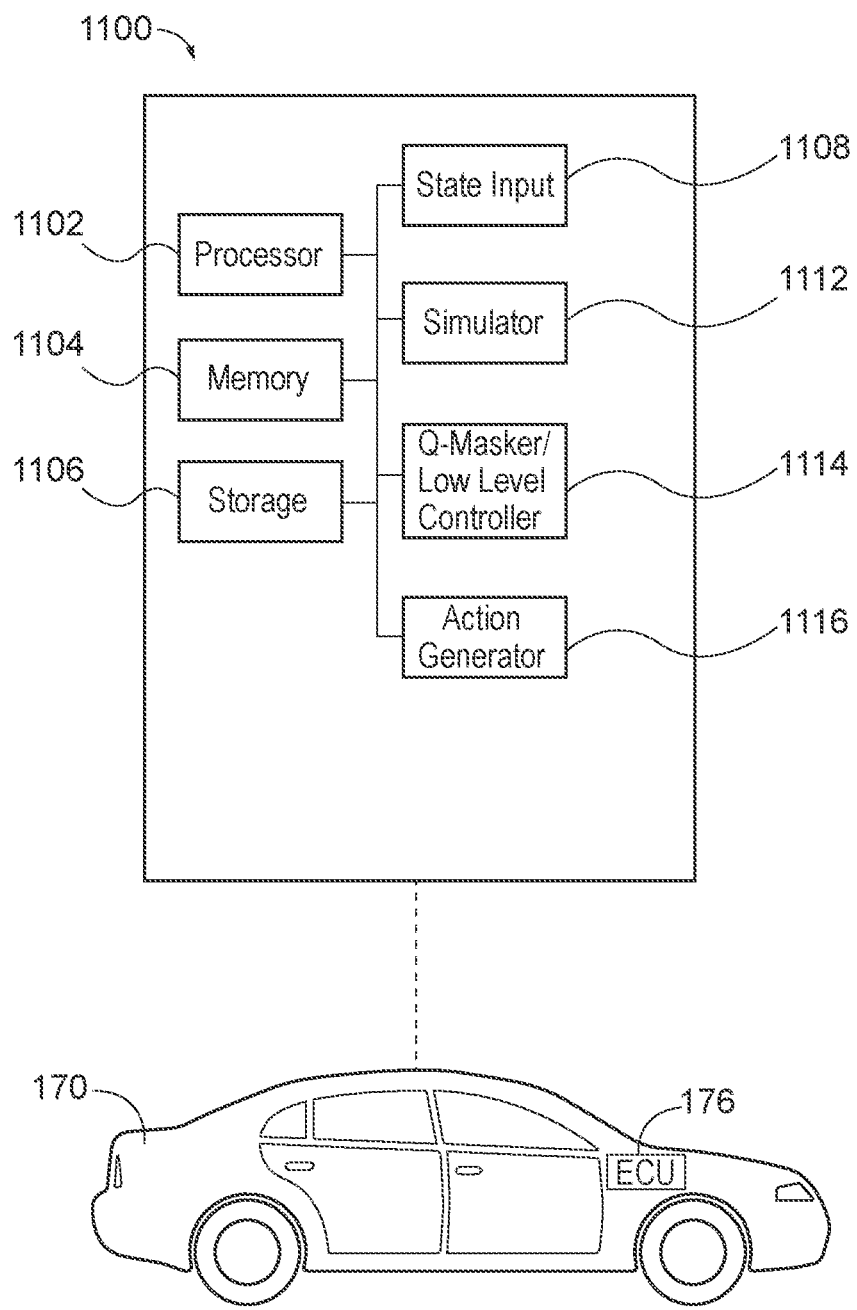
FIG. 11 is a component diagram of an autonomous vehicle policy generation system, according to one aspect.

FIG. 11 is a component diagram of an autonomous vehicle policy generation system 1100, according to one aspect. The system 100 for CM3 reinforcement learning may include one or more of the components or the entire autonomous vehicle policy generation system 1100 of FIG. 11. The autonomous vehicle policy generation system 1100 may include a processor 1102, a memory 1104, a storage drive 1106, a state input generator 1108, a traffic simulator 1112, a Q-masker 1114, and an action generator 1116. The state input generator 1108, traffic simulator 1112, Q-masker 1114, and action generator 1116 may be implemented via the processor 1102, the memory 1104, and/or the storage drive 1106.

The autonomous vehicle policy generation system 1100 may generate, through simulation and through Q-masking, an autonomous vehicle policy for the vehicle 170, which may implement the autonomous vehicle policy using the controller 176 of the vehicle 170, for example.

The state input generator 1108 may determine or generate state information associated with the autonomous vehicle, as simulated. In other words, the state input generator 1108 is responsible for determining inputs for a network associated with autonomous vehicle policy generation. Examples of these inputs may include the state of the simulated autonomous vehicle, including state information internal to the simulated autonomous vehicle (e.g., a velocity or a current velocity associated with the simulated autonomous vehicle) and state information external to the simulated autonomous vehicle (e.g., a lane location or a lane position associated with the simulated autonomous vehicle, and a distance from a goal, such as a desired destination). The goal may not necessarily be a final destination, but may be a waypoint destination along a route, for example. The traffic simulator 1112 may simulate the simulation environment which includes the simulated autonomous vehicle and one or more other vehicles (e.g., a first vehicle, a second vehicle, a third vehicle, etc.) within the simulation environment. The traffic simulator 1112 may be configured to control the other vehicles to maintain a velocity within a range.

According to one aspect, the traffic simulator 1112 may be the simulator 108 of the system 100 for CM3 reinforcement of FIG. 1. Additionally, the processor 1102 and the memory 1104 may be the same as the processor 102 and memory 104 from the system 100 for CM3 reinforcement of FIG. 1.

Because the distance to the goal may be considered as an input to the traffic simulator 1112, reasoning about long term decisions on a strategic level may be considered when present in a driving scenario, such as a multi-lane highway among traffic.

According to one aspect, the traffic simulator 1112 may control the other vehicles within the simulation environment to avoid collisions with one another, but not with the simulated autonomous vehicle (e.g., the agent). The Q-masker 1114 may be implemented via a low-level controller and be part of a deep Q-learning system which learns policies which enable the autonomous vehicle to make decisions on a tactical level. The deep Q-learning system may learn a mapping between states and Q-values associated with each potential action. Stated another way, the traffic simulator 1112, using the deep Q-learning system and without application of the Q-masker 1114, would proceed to simulate all possible actions for each time frame, which may utilize a great deal of computing power of the processor 1102 and the memory 1104. Therefore, learning a full policy, where each and every action is explored may be difficult with large networks to train.

In a Q-learning network, a mapping between states and Q-values associated to each action may be learned. According to one aspect, Q-masking, in the form of a mask that is applied on the output Q-values before a max (or soft max) operator may be applied on the output layer of Q-values to pick the 'best' action. In this regard, the direct effect of the Q-masker 1114 is that when taking the max operation to choose the 'best' action, only the Q-values associated with a subset of actions, which are dictated by a lower-level module, are considered.

Thus, the Q-masker 1114 may mask a subset of output Q-values which are to be simulated by the traffic simulator 1112. Therefore, only the Q-values associated with a remaining subset of actions are considered by the traffic simulator 1112 during simulation, thereby mitigating the amount of processing power and/or computing resources utilized during simulation and training of the autonomous vehicle in autonomous vehicle policy generation. Based on the remaining subset of actions (e.g., of a set of possible actions, the subset of actions excluding the masked subset), the action generator 1116 may explore the remaining actions and determine the autonomous vehicle policy accordingly. This may be repeated across one or more time intervals. The Q-masker 1114 may thereby 'force' the simulated autonomous vehicle to explore only the non-masked states, and thus, only learn a subset of the space of associated Q-values (which is indicative of the long-term return of an action (a) under policy ($\pi$) on state (s)).

In greater detail, the state input generator 1108 may generate a set of attributes associated with an autonomous vehicle undergoing training (e.g., the simulated autonomous vehicle). For example, the set of attributes may include the current velocity v associated with the autonomous vehicle, a lane position/associated with the autonomous vehicle, and a distance d2g from the autonomous vehicle to a goal, which may be a desired destination. Additionally, the set of attributes or the position information associated with the vehicle may be represented as an occupancy grid. The set of attributes may be state information which is indicative or representative of a state (S) or scenario associated with the autonomous vehicle. For example, information such as a posted speed limit or minimum and maximum speed limits of $v_{min}$ and $v_{max}$ may be determined based on the position or location of the autonomous vehicle.

The traffic simulator 1112 may simulate a simulation environment including the autonomous vehicle, a roadway associated with a number of lanes, and one or more other vehicles within the simulation environment. The traffic simulator 1112 may generate traffic at a traffic density, and each lane may be assigned a probability $P_{lane}$ of emitting a vehicle at a start position at a time interval, where the other vehicle may be associated with a random start velocity, a random target speed, and a range within which to stay within from the random target speed. The traffic simulator 1112 may use models which control the other vehicles to avoid collisions with each other, but not the simulated autonomous vehicle. According to one aspect, the traffic simulator 1112 does not control the simulated autonomous vehicle, but merely controls the other vehicles within the simulation environment to only avoid collisions with each other (and not the simulated autonomous vehicle).

The traffic simulator 1112 may be a deep Q-learning system, which implements reinforcement learning based on the state input generated attributes for the simulated autonomous vehicle and the simulation environment provided by the traffic simulator 1112. Within the simulation environment managed by the traffic simulator 1112, the simulated autonomous vehicle may be an agent, which may take simulated actions from the set of possible actions. The set of possible actions may be known as the action set (A). For example, the set of possible actions for the autonomous vehicle includes an autonomous driving maneuver of, during a time interval, maintaining the current velocity associated with the autonomous vehicle, accelerating, decelerating, performing a right lane change, or performing a left lane change.

The simulation environment may be the world or the environment through which the simulated autonomous vehicle moves. The traffic simulator 1112 simulates the simulated environment and uses the simulated autonomous vehicle's current state and action (e.g., for a given time interval) as an input, and returns the simulated autonomous vehicle's reward, described below, and next state as an output. For example, the traffic simulator 1112 may take the vehicle's current state (e.g., 50 mph) and action (e.g., deceleration), and apply the laws of physics to determine the simulated autonomous vehicle's next state (e.g., 45 mph).

The traffic simulator 1112 may utilize a reward function (R) which may be a function that evaluates a taken (e.g., simulated) action. Stated another way, the reward function may be utilized to measure success or failure. For example, if the simulated autonomous vehicle misses a goal (e.g., desired destination) or becomes involved in a collision, the reward function may penalize the simulated action that led to the current state (e.g., the missed goal or the collision). Conversely, the reward function may award rewards based on the fastest time or fastest route to the goal. Rewards may be provided immediately or may be delayed, based on the reward function. The rewards provided by the reward function enables reinforcement learning to occur based on a given goal (e.g., reach an exit ramp).

A discount factor ($\gamma$) may be multiplied with future rewards to make short-term decisions weigh more than long-term rewards. Stated another way, the discount factor may be used to make future rewards worth less than immediate rewards. In this regard, a value (V) may be an expected long-term return which includes the effect of the discount. A Q-value (Q) may be an action value, which is indicative of the long-term return of an action (a) under policy ($\pi$) on state (s). A trajectory may be a sequence of states and/or actions which include those states. A policy ($\pi$) or autonomous vehicle policy may be a strategy by which the action generator 1116 uses or employs to determine the next action for the autonomous vehicle based on the current state (e.g., as indicated by the set of attributes associated with the autonomous vehicle).

According to one aspect, the reward function may be:

$$r_T = \begin{cases} +10 & l = 0; \text{ exit reached} \\ -10 \times l & l \neq 0; \text{ exit missed} \end{cases},$$

where l is the lane in which the simulated autonomous vehicle is located at a target distance D from a start position.

Thus, according to this reward function, a positive terminal reward is given for success (e.g., reaching the goal) and an increasingly negative terminal reward the further the simulated autonomous vehicle ends up away from the lane associated with the goal. The discount factor may encourage the simulated autonomous vehicle to reach the goal in the shortest amount of time or smallest number of time intervals (i.e., maintaining a higher average speed). Further, since collisions are never allowed during training, the reward function does not need to account for collisions, thereby simplifying the reward function.

For example, given a state, the Q-masker 1114 may restrict or otherwise "mask off" any set of actions that the agent or simulated autonomous vehicle does not need to explore or learn from their outcomes. In other words, if the simulated autonomous vehicle is positioned in the left most lane, then taking a left lane change action would result in getting off the highway. Therefore, the Q-masker 1114 may put a mask on the Q-value associated with the left action such that the left lane change action is never selected in such a state. This enables prior knowledge about the system (i.e., highway shoulders in this example) to be incorporated directly in to the learning process. In turn, a negative reward for getting off the highway does not need to be setup, thereby simplifying the reward function.

Also, since the action generator 1116 does not explore these states, the learning itself becomes faster and more efficient. What the action generator 1116 ends up learning is a subset of the actual space of Q-values, rather than the entire set. Constraints on the system may also be incorporated in a similar manner. For example, if the autonomous vehicle is driving at the maximum speed $V_{max}$, the accelerate action may be masked (or if at the minimum speed $v_{min}$, then decelerate action is masked). In this way, the action generator 1116 is not required to spend time learning the speed limits of the highway or roadway.

The Q-masker 1114 may determine a mask to be applied to a subset of the set of possible actions for the autonomous vehicle for a time interval. These masks sets of actions will not be explored or considered by the action generator 1116, thereby mitigating the amount of computational resources (e.g., processing power, memory, storage, etc.) utilized by a system for autonomous vehicle policy generation.

According to one aspect, the Q-masker 1114 may determine the mask to be applied based on prior knowledge, one or more traffic rules, constraints or information from the low-level controller, or a capability associated with the autonomous vehicle. The prior knowledge may be indicative of predefined permissible interactions between the autonomous vehicle and the simulation environment or between the autonomous vehicle and other vehicles within the simulation environment. Stated another way, the Q-masker 1114 may utilize prior knowledge to mask actions which may result in collisions between the simulated autonomous vehicle and other vehicles, increase a time to collision (TTC), cause the simulated autonomous vehicle to deviate from the roadway, or fall outside of a desired operating threshold or range, for example.

The traffic rule may be indicative of permissible driving maneuvers based on the location or current position of the vehicle. For example, the traffic rule may include a maximum speed limit, a minimum speed limit, driving etiquette, such as not swerving, performing double lane changes without a pause in between, not performing driving maneuvers which would 'cut off' another driver, etc. Stated another way, the Q-masker 1114 may determine, based on the traffic rule, the masked subset of actions to include accelerating when the current velocity associated with the autonomous vehicle is greater than a speed limit associated with the roadway and decelerating when the current velocity associated with the autonomous vehicle is less than a minimum speed limit associated with the roadway. In this way, accelerating and decelerating actions which would break minimum and maximum speed limits of $v_{min}$ and $v_{max}$ would be masked by the Q-masker 1114.

Other traffic rules may include not passing on a double lane marking. For example, the Q-masker 1114 may determine, based on the traffic rule, the masked subset of actions to include an autonomous driving maneuver of performing a right lane change when the autonomous vehicle is positioned directly right of double lane markings of the roadway and an autonomous driving maneuver of performing a left lane change when the autonomous vehicle is positioned directly left of double lane markings of the roadway.

Additionally, the capability associated with the autonomous vehicle may be indicative of physically possible driving maneuvers associated with the autonomous vehicle. For example, if the autonomous vehicle is already travelling at top speed, accelerating may not be possible, and thus, the acceleration action may be masked by the Q-masker 1114. As another example, when the vehicle is operating at a'' operation velocity, it may not be desirable to decelerate or apply a hard braking action due to the impact this would have on the smoothness of the ride. This may be applied by the Q-masker 1114 as an acceleration or deceleration threshold, so that actions taken by the autonomous vehicle do not exceed this acceleration or deceleration threshold is most scenarios.

However, in some scenarios, such as a scenario to prevent or mitigate a collision, the Q-masker 1114 may permit the acceleration or deceleration threshold to be exceeded. In this way, the Q-masker 1114 may implement thresholds in a scenario specific fashion. Stated another way, the Q-masker 1114 may utilize one or more kinematics rules to apply a level of maximum accelerations or decelerations to enable the ride to feel more comfortable, while considering the safety of the passengers (e.g., this threshold may be overridden to avoid collisions). Further, different kinematics rules may be implemented based on the current velocity, current position, current acceleration, etc. of the vehicle. For example, the acceleration threshold may be greater when the vehicle is in motion than when the vehicle is at rest.

Other examples of actions which may be masked by the Q-masker 1114 include lane changes which would result in the autonomous vehicle travelling off of the roadway. Stated another way, the Q-masker 1114 may determine, based on the prior knowledge, the masked subset of actions to include an autonomous driving maneuver of performing a right lane change when the autonomous vehicle is positioned on a right-most lane of the roadway and an autonomous driving maneuver of performing a left lane change when the autonomous vehicle is positioned on a left-most lane of the roadway.

Similarly, the Q-masker 1114 may mask actions which are associated with accelerating or decelerating into another vehicle. For example, the Q-masker 1114 may determine, based on the prior knowledge, the masked subset of actions to include an autonomous driving maneuver of accelerating when the autonomous vehicle is positioned a first threshold distance behind the other vehicle when both the autonomous vehicle and the other vehicle are positioned in the same lane and a" autonomous driving maneuver of decelerating when the autonomous vehicle is positioned a second threshold distance ahead of the other vehicle when both the autonomous vehicle and the other vehicle are positioned in the same lane.

According to another aspect, the Q-masker 1114 may mask actions of the simulated autonomous vehicle based on other thresholds (e.g., no lane changes based on a lane change threshold distance or no actions associated with decreasing a time to collision (TTC) estimate in some scenarios). For example, the Q-masker 1114 may determine, based on the prior knowledge, the masked subset of actions to include an autonomous driving maneuver of a left lane change when the autonomous vehicle is positioned to the right and within a lane change threshold distance of the other vehicle and an autonomous driving maneuver of a right lane change when the autonomous vehicle is positioned to the left and within the lane change threshold distance of the other vehicle. The Q-masker 1114 may determine, based on the prior knowledge, the masked subset of actions to include any driving maneuver associated with an anticipated decrease with a TTC estimate between the autonomous vehicle and the other vehicle when the TTC estimate is below a threshold TTC value.

In this way, the Q-masker 1114 provides many benefits and/or advantages. For example, using Q-masking, the reward function may be simplified, thereby making the deep-Q learning faster and more efficient. Stated another way, the reward function may be simplified by incorporating prior knowledge directly into the learning process (e.g., training the network), as implemented by the traffic simulator 1112 and the action generator 1116. Because the Q-masker 1114 masks actions based on prior knowledge, negative reward functions are not required, thereby simplifying the reward function. By using Q-masking, the Q-masker 1114 may mitigate or eliminate collisions during training or testing, thereby making it possible to perform training directly on real systems, and not necessarily just those under simulation. Stated another way, the Q-masker 1114 may enable implementation of training of autonomous vehicles on actual autonomous vehicles. Therefore, according to one aspect, the traffic simulator 1112 may be instead replaced with a sensor that detects one or more other vehicles (e.g., a first vehicle, a second vehicle, a third vehicle, etc. and one or more associated attributes, such as a velocity, position, lane location, turn signals, etc.).

The action generator 1116 may explore a remaining set of actions from the set of possible actions and determine the autonomous vehicle policy for the time interval based on the remaining set of actions (e.g., excluding the masked subset of actions) and the set of attributes associated with the autonomous vehicle. The action generator 1116 may explore the remaining set of actions from the set of possible actions and determine the autonomous vehicle policy for one or more additional time intervals, such as until the autonomous vehicle reaches a terminal state (e.g., the goal or desired destination). Here, the action generator 1116 may store one or more of the explored set of actions associated with the one or more additional time intervals as one or more corresponding trajectories. As previously discussed, a trajectory may be a sequence of states and/or actions which include those states.

The action generator 1116 may explore the remaining set of actions from the set of possible actions based on the reward function and determine the autonomous vehicle policy based on the reward function. The reward function may include the discount factor. Through training and/or simulation, the action generator 1116 may learn the autonomous vehicle policy, which may be stored to the storage drive 1106, communicated to the vehicle 170, and implemented via the vehicle ECU 176 to facilitate autonomous driving.

During training, actions may be taken in an epsilon-greedy manner and E may be annealed. The action generator 1116 may simulate full trajectories until the terminal state and classify the trajectories as either good or bad (i.e., the good buffer is associated with the simulated autonomous vehicle making it to the goal without being involved in collisions, exceeding the speed limit, etc.). Explained another way, all transitions (i.e., state, action, and reward tuples from successful trajectories) are saved in the good buffer while transitions from failed trajectories (i.e., not making it to the goal) are saved in the bad buffer.

For any transition, the expected reward may be back calculated from the terminal reward, given by the following:

$$y_t = \begin{cases} r_t & t = T; \text{terminal} \\ r_t + \gamma y_{t+1} & \text{otherwise} \end{cases},$$

where $\gamma$ is the discount factor.

The network may be optimized using the following loss function, using a mini batch of transitions equally sampled from the good and bad buffer:

$$\mathcal{L}(\theta) = (y_t - Q(s_t, a_t, \theta))^2$$

The two separate buffers help maintain a decent exposure to successful executions when the exploration might constantly lead to failed trajectories, thus avoiding the network getting stuck in a local minima.

In this way, the autonomous vehicle policy generation system 1100 provides a framework that leverages the strengths of deep reinforcement learning for high-level tactical decision making and demonstrates a more structured and data efficient alternative to end-to-end complete policy learning on problems where a high-level policy may be difficult to formulate using traditional optimization or rule based methods, but where well-designed low-level controllers (e.g., the controller implementing the Q-masker 1114) are available. The autonomous vehicle policy generation system 1100 uses deep reinforcement learning to obtain a high-level policy for tactical decision making, while maintaining a tight integration with the low-level controller.

Applying this framework to autonomous lane changing decision making for self-driving vehicles (e.g., autonomous vehicles), the network may learn a high-level tactical decision making policy. Experimental results against a greedy baseline and human drivers have proven that the autonomous vehicle policy generation system 1100 and method described herein are able to outperform both with more efficient and at a much lower collision rate (e.g., by eliminating collisions). The greedy baseline may be a policy where the autonomous vehicle prioritizes making a right lane change until it is in the correct lane, then travelling as fast as possible while staying within speed limits, and not colliding with other vehicles.

According to one aspect, the state input generator 1108 may note occlusions and the traffic simulator 1112 may provide a probabilistic occupancy grid. Further, the traffic simulator 1112 may receive a history of the occupancy grid from previous time intervals, as separate channels.

Figure 12:
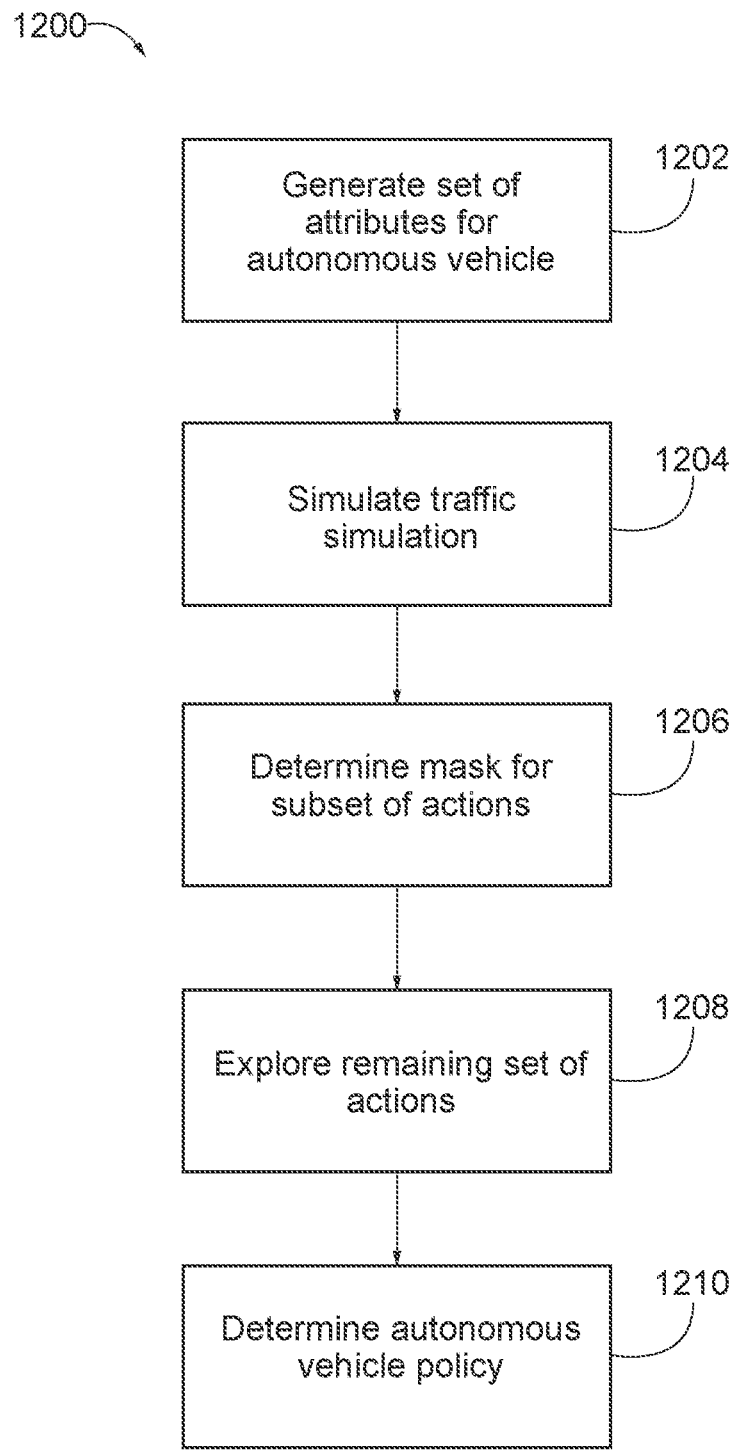
FIG. 12 is a flow diagram of an autonomous vehicle policy generation method, according to one aspect.

FIG. 12 is a flow diagram of an autonomous vehicle policy generation method 200, according to one aspect. At 1202, a set of attributes for an autonomous vehicle is generated. The set of attributes may include a current velocity associated with the autonomous vehicle, a lane position associated with the autonomous vehicle, and a distance from the autonomous vehicle to a goal, wherein the goal is a desired destination. At 1204, a traffic simulation is performed. For example, the simulation environment may include the autonomous vehicle, a roadway associated with a number of lanes, and another vehicle within the simulation environment.

At 1206, a mask is determined for a subset of actions. The mask may be determined based on prior knowledge indicative of predefined permissible interactions between the autonomous vehicle and the simulation environment or between the autonomous vehicle and the other vehicle within the simulation environment, a traffic rule indicative of permissible driving maneuvers, or a capability associated with the autonomous vehicle indicative of physically possible driving maneuvers associated with the autonomous vehicle.

At 1208, a remaining set of actions which are not masked is explored.

Stated another way, the simulation may explore all possible outcomes associated with the remaining set of actions, sorting these into two classes: good and bad, where good is associated with the simulated autonomous vehicle reaching the goal, and bad is associated with the simulated autonomous vehicle not reaching the goal. At 1210, a″ autonomous vehicle policy is determined, such as based on the reward function or discount factor, which accounts for time, future reward versus present reward, etc.

Figure 13A:
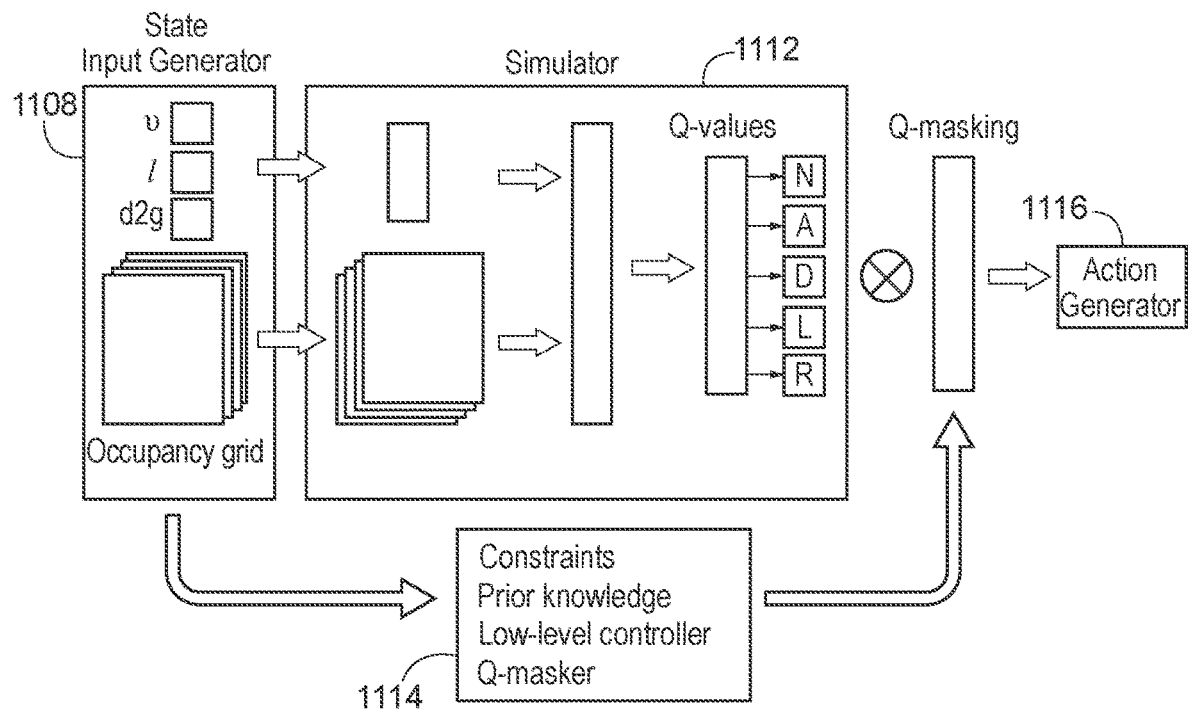
FIG. 13A is a flow diagram of an autonomous vehicle policy generation method, according to one aspect.

FIG. 13A is a flow diagram of an exemplary autonomous vehicle policy generation method, according to one aspect. The occupancy grid with history may be passed through a single convolution layer, flattened out, and concatenated with the output of a fully connected layer with the scalar inputs generated by the state input generator 1108. The concatenation is passed through a fully connected layer to give the final output of 5 Q-values associated with the 5 tactical actions. As seen in FIG. 13A, Q-masking by the Q-masker 1114 is injected between the Q-values and the max operation to determine the action by the action generator 1116, thereby incorporating prior information so learning from scratch through exploration does not need to occur. The max operation may be a max or soft-max operation on the Q-values to select an action.

Figure 13B:
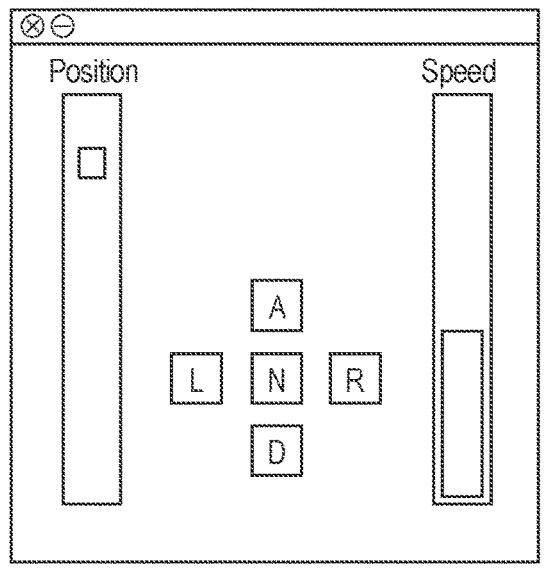
FIG. 13B is an exemplary simulation interface associated with autonomous vehicle policy generation, according to one aspect.

FIG. 13B is an exemplary simulation interface associated with autonomous vehicle policy generation, according to one aspect. As previously discussed, the set of possible actions for the autonomous vehicle includes an autonomous driving maneuver of, during a time interval, maintaining the current velocity associated with the autonomous vehicle (e.g., 'N' or no operation), accelerating (A), decelerating (D), performing a right lane change (R), or performing a left lane change (L). In addition to decelerating (D), other actions, such as a brake release action, are also contemplated. According to one aspect, the acceleration threshold may not be implemented when taking the brake release action. In other words, releasing the brake may always be an option so that the Q-masker 1114 never masks the brake release action, according to this aspect.

Figure 14A:
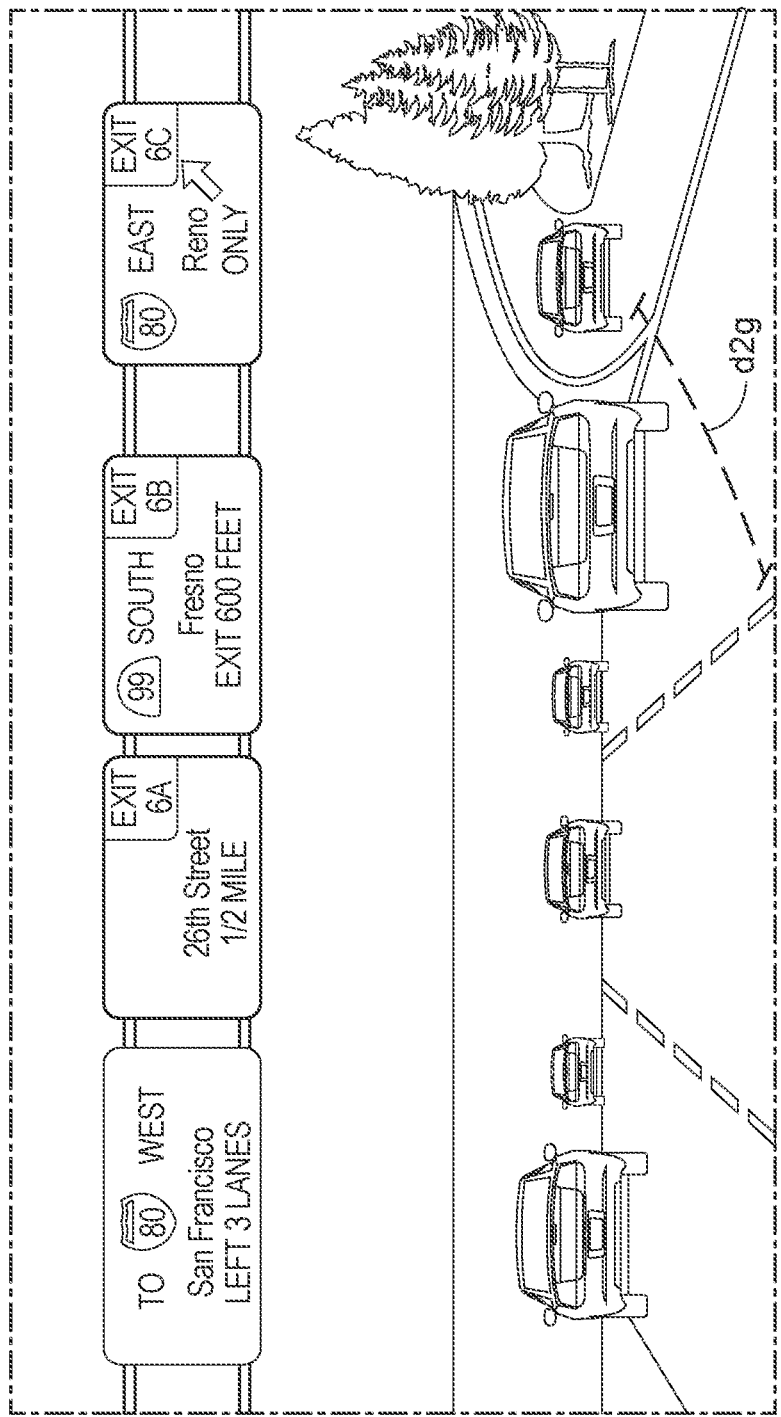
FIGS. 14A-14C are exemplary scenarios where autonomous vehicle policy generation may be implemented, according to one aspect.
Figure 14B:
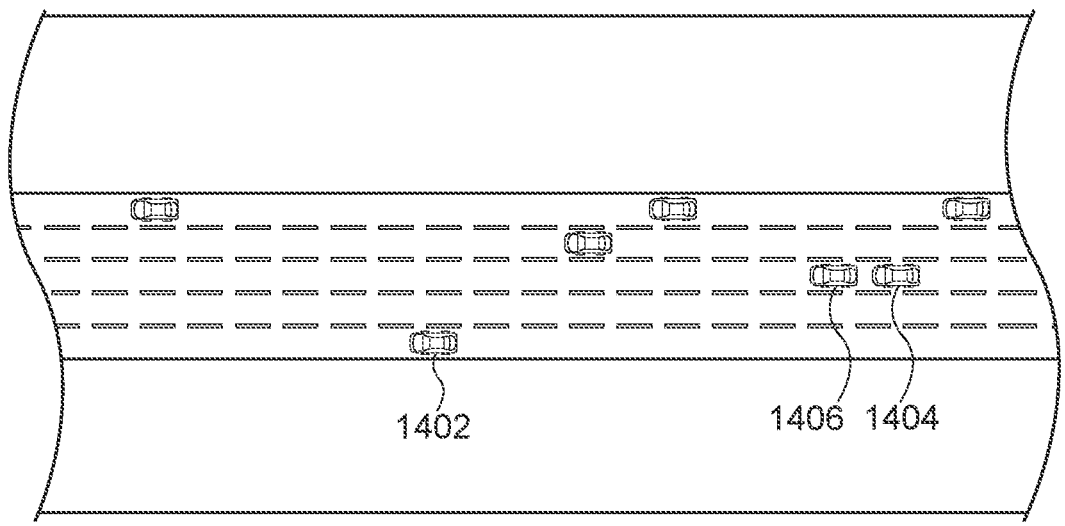
Figure 14C:
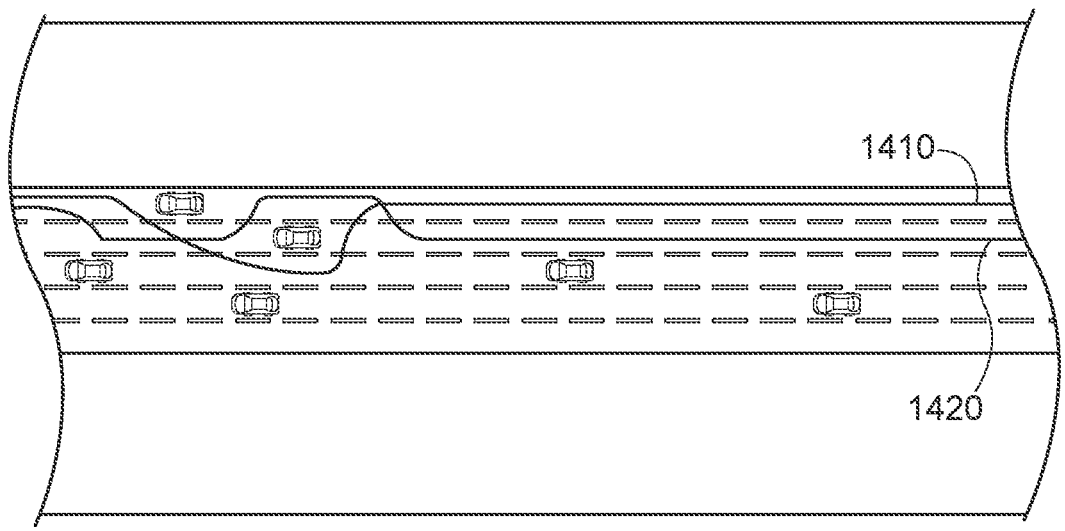

FIGS. 14A-14C are exemplary scenarios where autonomous vehicle policy generation may be implemented, according to one aspect. According to one exemplary aspect, the simulated autonomous vehicle is tasked with reaching an exit at the right most lane in a minimum amount of time, as seen in FIG. 14A, while respecting speed limits and avoiding collisions, etc. In FIG. 14A, the autonomous vehicle is a distance to goal d2g from the exit. If the simulated autonomous vehicle fails to reach the exit (e.g., the goal in this scenario), this is considered a failure by the action generator 1116 or the traffic simulator 1112. Because the distance to goal is being considered along with information, such as the prior knowledge of constraint information from the low-level controller, both high-level and low-level considerations are being taken into account.

In FIG. 14B, if the autonomous vehicle or agent is at position 1402, the left lane change action may be masked by the Q-masker 1114 because the autonomous vehicle is already in the left-most lane of the roadway. Similarly, the acceleration action may be masked by the Q-masker 1114 when the autonomous vehicle is at position 1404, while the deceleration action may be masked by the Q-masker 1114 when the autonomous vehicle is at position 1406. These acceleration and deceleration actions may be masked based on threshold distances to other vehicles, respectively.

In FIG. 14C, two different trajectories 1410 and 1420 are shown. The action generator may select the trajectory associated with a higher reward (e.g., faster time) because the Q-masker 1114 has already mitigated the majority of risk in any decision making involved with the respective trajectories.

Figure 15:
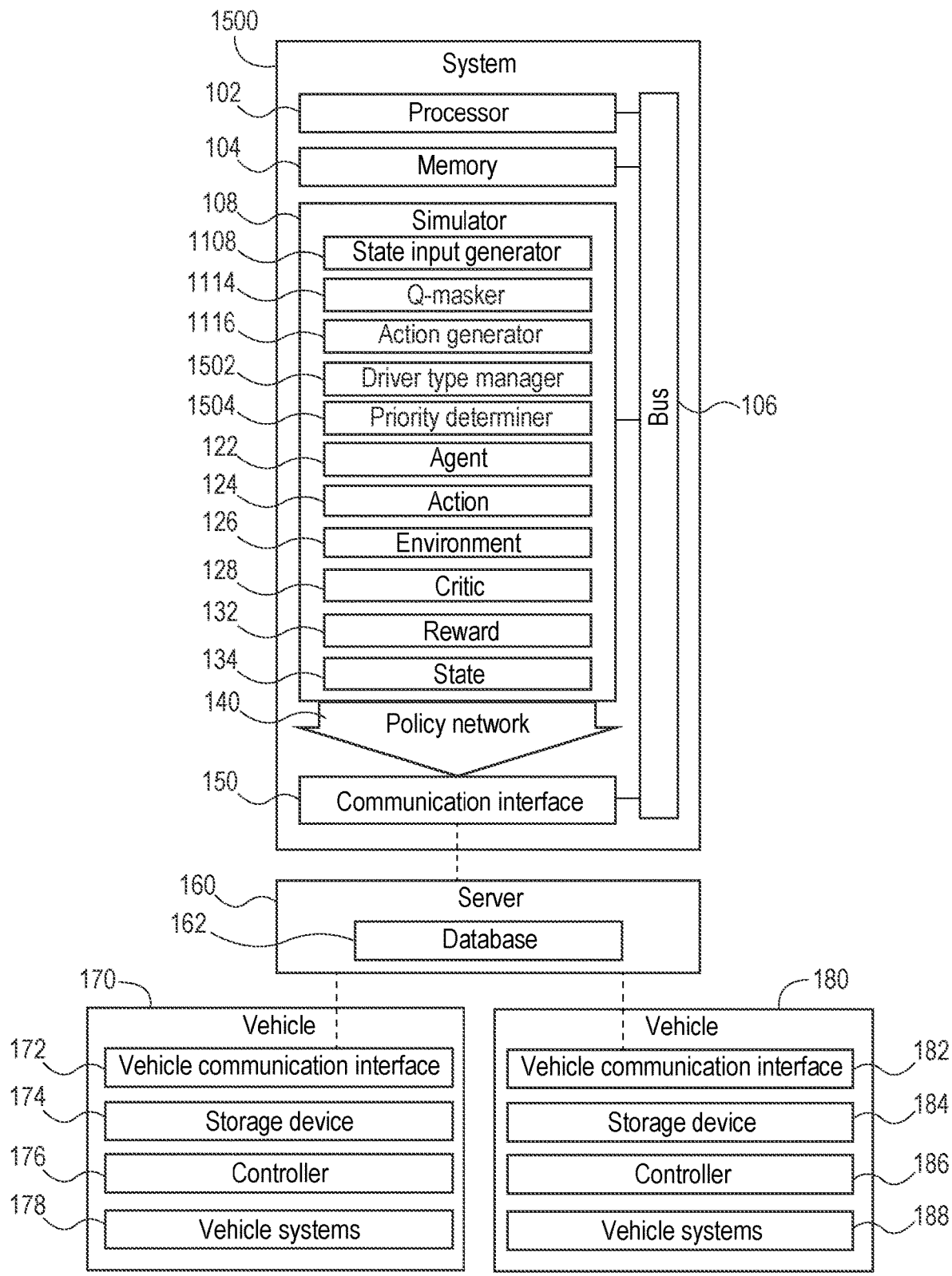
FIG. 15 is an exemplary component diagram of a system for interaction-aware decision making, according to one aspect.

FIG. 15 is an exemplary component diagram of a system for interaction-aware decision making 1500, according to one aspect. The system for interaction-aware decision making 1500 may utilize features of cooperative multi-goal, multi-agent, multi-stage (CM3) reinforcement learning, as discussed above with reference to FIGS. 1-10. Additionally, the system for interaction-aware decision making 1500 may utilize features of autonomous vehicle policy generation, as discussed above with reference to FIGS. 11-14. The system for interaction-aware decision making 1500 may include a processor 102, a memory 104, a simulator 108, and a communication interface 150. These components may be communicatively coupled via a bus 106. The simulator 108 of the system for interaction-aware decision making 1500 may perform multi-stage training according to a first stage and a second stage.

Within the first stage, the simulator 108 may perform training for a first agent based on a first policy gradient and a training first critic based on a first loss function to learn one or more features in a single-agent environment using a Markov decision process (MDP). In the single-agent environment, the first agent is the only agent present. Features within the environment may include one or more branches to a roadway, one or more lanes, one or more obstacles (e.g., which may be static during the stage one training). In the stage one training (e.g., the first stage of training), the simulator 108 may train the agent to achieve one or more tasks or goals. Because there are no other agents within the single-agent environment, the single-agent setting or environment provided by the simulator 108 in stage one enables the first agent to learn or be trained on the one or more features of the single-agent environment in an expedient, efficient fashion, as the absence of other agents may more reliably produce the desired state configurations for learning behavior associated with achieving goals. In this way, fewer iterations of simulation may be required to reach a level of driving or operational competency.

The simulator 108 may include a state input generator 1108, a Q-masker 1114, an action generator 1116, a driver type manager 1502, and a priority determiner 1504. The state input generator 1108 may determine or generate state information associated with the first agent, which is a simulated agent. In this way, the state input generator 1108 may determine inputs for a network associated with multi-goal, multi-agent, multi-stage, interaction-aware decision making network policy generation. Examples inputs generated by the state input generator 1108 may include the state of the first agent, such as a current velocity, a lane position, a distance from a goal or desired destination, etc.

The Q-masker 1114 may mask a subset of output Q-values (e.g., an action set) to be simulated by the simulator 108. The action generator 1116 may train the first agent based on a remaining set of actions by excluding the masked set of actions from the set of possible actions. Therefore, only the Q-values associated with a remaining subset of actions are considered by the simulator 108 during simulation, thereby mitigating the amount of processing power and/or computing resources utilized during simulation and training of the autonomous vehicle in autonomous vehicle policy generation.

Based on the remaining subset of actions (e.g., of a set of possible actions, the subset of actions excluding the masked subset), the action generator 1116 may explore the remaining actions and determine the autonomous vehicle policy accordingly. This may be repeated across different time intervals. The Q-masker 1114 may thereby 'force' the simulated autonomous vehicle to explore only the non-masked states, and thus, only learn actions associated with a subset of the space of associated Q-values (indicative of the long-term return of an action (a) under policy (Tr) on state (s)).

During the training of the first agent based on the first policy gradient and training the first critic based on the first loss function within the single-agent environment according to the MDP, the simulator 108 may train the first agent by enabling the first agent to select an action from a set of one or more actions. The set of possible actions may include a no-operation action, an acceleration action, a deceleration action, a brake release action, a shift left one sub-lane action, or a shift right one sub-lane action.

Examples of one or more of the features which may be learned in stage one by the first agent may include learning rules and regulations of the roadway, how to drive on a roadway within the speed limit or maintain speed, how to maintain the vehicle within the lane, how to change lanes or change sub-lane positions, how to exit on an exit ramp, how to enter an on-ramp, etc.

In this way, the first policy network has a decentralized critic which may learn different features in the single-agent setting or environment. Because the first critic may be the decentralized critic, the first stage or stage one may be associated with a local view or individualized rewards, individualized learning, etc. for the first agent. In this way, the simulator 108 may train the first agent based on the first policy gradient and train the first critic based on a first loss function to learn one or more goals in the single-agent environment (where the first agent is the only agent present), using a Markov decision process. The first agent may be associated with a first agent neural network and the first critic may be associated with a first critic neural network.

The simulator 108 may perform stage two training, including training a number N of agents based on the first policy gradient and a second policy gradient and training a second critic based on the first loss function and a second loss function to learn a second set of features between the N number of agents (e.g., which may include the first agent) in a multi-agent environment using a Markov game to instantiate a second agent neural network. According to one aspect, one or more of the N number of agents of the multi-agent environment may be associated with a driver type indicative of a level of cooperation for the respective agent. In other words, in stage two training, the simulator 108 may teach the first agent how to drive or operate when less cooperative drivers are around, as simulated by the competitive driver type.

One or more of the N number of agents may be instantiated or initialized with the pre-trained first agent neural network from the stage one training. Thus, each one of the N number of agents may have prior knowledge from the pre-trained first agent neural network, and curriculum gain may be implemented using CM3 reinforcement learning. The simulator 108 may train the N number of agents based on a combined policy gradient derived from the first policy gradient and the second policy gradient. However, based on the driver type (e.g., indicative of the level of cooperation for the respective agent of the N number of agents), one or more of the N number of agents may not necessarily be cooperative during the stage two training, thereby enabling the first agent to learn how to operate or how to drive in an environment where other agents (e.g., vehicles) aren't necessarily friendly or cooperative all of the time. Further, as previously indicated, the driver type of one or more of the N number of agents may change during simulation or training (e.g., mid-training), according to one aspect. According to other aspects, the driver type of one or more of the N number of agents may remain constant during the simulation or the stage two training. A mathematical frame board may be used to generate different types of behavior for the agents with different driver types. According to one aspect, the driver type may be cooperative or competitive. According to another aspect, the driver type may be represented by a number (e.g., on a scale of 1 to 10 or on a scale from −2 to +2, etc.).

For example, on the merge lane, a really cooperative driver (e.g., +2) may decelerate in advance before merging into traffic for safety purposes, while a less cooperative driver (e.g., −2) may accelerate and fight for space to merge. Similarly, on the main lane or roadway, a cooperative driver may yield to a merging vehicle, while a competitive driver may accelerate and try to pass the merge point first.

Regardless, the simulator 108 may train the N number of agents based on a first policy gradient and train a second policy gradient and a second critic based on a first loss function and a second loss function to learn one or more goals in the multi-agent using a Markov game to instantiate a second agent neural network. Within the stage two training, fault may be assigned when a collision occurs between two vehicles. Each agent of the N number of agents may be assigned a lane priority level based on the position of the respective agent and a layout of the multi-agent environment.

For example, if a first vehicle is on a straightaway within a roadway and a second vehicle is in a lane which merges with the straightaway, the first vehicle may be assigned a higher lane priority level than the second vehicle. In this scenario, the priority determiner 1504 may assign the fault to the second vehicle in the event of a collision between the first vehicle and the second vehicle based on the second vehicle being in the merging lane. However, because the priority determiner 1504 may assign the lane priority level to each vehicle based on the based on the position of each vehicle and also based on the layout of the multi-agent environment (e.g., the configuration of the roadway), there may be scenarios where the first vehicle may be assigned a lower lane priority level than the second vehicle.

For example, if the second vehicle, in the lane merging with the straightaway, is ahead of the first vehicle by at least a threshold distance, the priority determiner 1504 may assign the fault to the first vehicle in the event of a collision between the first vehicle and the second vehicle based on the second vehicle being ahead of the first vehicle (e.g., and the first vehicle rear-ending the second vehicle). Further, a percentage of fault may be assigned based on a distance between the first vehicle and the second vehicle. The priority determiner 1504 may utilize this percentage of fault to determine a negative reward or a penalty to be assigned to each one of the respective agents or vehicles involved with the collision.

Specifically, the priority determiner 1504 may not necessarily penalize or assign negative rewards to all parties involved in the simulated accident or collision because fault may be assigned similarly to real-life traffic rules. Additionally, yet other scenarios exist where the priority determiner 1504 may determine that two or more vehicles have an equal lane priority level, and if a collision occurs in this scenario, the vehicles involved may be assigned an equal amount of fault. In this way, the simulator 108 may train the network policy to enable the vehicles or agents to operate in a scenario where none of the agents have any higher priority than others, but that sometimes other drivers may go ahead, while other times, the first agent may be the one to go first. Further discussion and examples of aspects of the priority determiner 1504 will be made with reference to FIGS. 19A-19D, discussed below.

Returning to the discussion regarding stage two training by the simulator 108, the first agent may be made aware that it has a higher lane priority level than another one of the N number of agents, but due to the differing driver types which may be assigned by the driver type manager 1502, the other agent may not necessarily yield according to their lower lane priority level. Stated another way, and with reference to the example above, where the first vehicle is on the straightaway and the second vehicle is in the lane which merges with the straightaway, during the stage two training, some agents in the position of the second vehicle may not necessarily yield (e.g., the second vehicle may actually accelerate or ignore the first vehicle) to the first vehicle, while other agents in the position of the second vehicle may yield, as required by the differing lane priority levels of the two vehicles or agents.

Explained yet again, because real-life drivers may cut-off other drivers or operate their own vehicles in a non-cooperative or competitive manner, the systems and method for interaction-aware decision making described herein account for this by training the first agent in the multi-agent environment where simulated non-cooperative or competitive agents (e.g., some of the N number of agents) exist, thereby causing a variety of crash or collision scenarios from which the simulator 108 may train the network policies and/or the N number of agents. For example, the non-cooperative driver of the driver type may accelerate during his own merging operation or during other agent's merging operations. Conversely, a cooperative driver of the driver type may decelerate in advance before merging into traffic or yield to another agent during that other agent's merging operation.

Further, based on observations of actions taken by one or more of the N number of agents within the multi-agent environment, the simulator 108 may note an observed driver type for one or more of the N number of agents (e.g., from the perspective of the first agent). In other words, if the first agent observes that a second agent is acting in a manner not in accordance with that agent's lane priority level, the driver type manager 1502 may note that the second agent is of the non-cooperative driver type or estimate a driver type based on the observation. In this way, the simulator 108 may enable training of the first agent and generation of a multi-goal, multi-agent, multi-stage, interaction-aware decision making network policy based on the first agent neural network and the second agent neural network, thereby incorporating CM3, the concept of road priority, and the concept of cooperative and non-cooperative drivers, etc.

Further, the systems and methods for interaction-aware decision making may incorporate adaptive behaviors (IDAB) and be applied to autonomous vehicles under merging scenarios, while using multi-agent reinforcement learning and the one actor, double critic aspect of CM3. Because interactions between the first agent and other agents of the N number of agents may be different (e.g., depending on the driver type of the other agent), the first agent will learn different response strategies during training in the multi-agent environment. Specifically, the network policies learned will generally be adaptive with respect to observed driving behaviors of others. Additionally, the Q-masker 1114 may be implemented to adopt a masking mechanism which promotes a faster and more efficient learning process.

With respect to the Markov games, the simulator 108 may define a multi-agent Markov game with N number of agents labeled by $n \in [1, N]$. The Markov game may be defined by a set of states S describing possible configurations of all agents, a set of partial observations $\mathcal{O}^n$, and a set of actions $A^n$ for each agent. The priority determiner 1504 and the driver type manager 1502 may determine or generate the lane priority and driver type information, respectively, $\{b_{prio}^n, b_{type}^n\} \in B^n$, which are two predetermined parameters which may influence an agent's behavior. Each agent n may, via the simulator 108, select its own actions according to a stochastic policy $\pi^n: \mathcal{O}^n \times B^n \times A^n \to [0,1]$, and the joint action of N agents move the multi-agent environment to the next state according to the transition function $\mathcal{T}: S \times A^1 \times \ldots \times A^N \rightarrow S$. Each agent may receive a reward $r^n: S \times B^n \times A^n \rightarrow \mathbb{R}$, which is a function of the state, the agents behavior, and agents actions, to maximize its own total expected return $R^n = \Sigma_{t=0}^T \gamma^t r_t^n$, where $\gamma \in [0, 1)$ is a discount factor, and T is the time horizon.

Actor critic methods may be utilized for different reinforcement learning tasks, within both the single agent and multi-agent environments. The actor may be a parameterized policy that defines how actions are selected. The critic may be an estimated state-value function that criticizes the actions made by the actor. The simulator 108 may then update the parameters of the actor with respect to the critic's evaluation.

Generally, in a single-agent environment, $\pi$ is parameterized by $\theta$, maximizes the objective $J(\theta) = \mathbb{E}_\pi[R]$ by taking steps in the direction of $\nabla_\theta J(\theta)$, where the expectation $\mathbb{E}_\pi$ is with respect to the state-action distribution induced by $\pi$. The gradient of the policy may be written as:

$$\nabla_\theta J(\theta) = \mathbb{E}_\pi[\Sigma_t \nabla_\theta \log \pi(a_t|s_t)(Q^\pi(s_t,a_t)-b(s_t))]$$

where $Q^\pi(s_t, a_t) = \mathbb{E}_\pi[\Sigma_{t'=t}^T \gamma^{t'} r(s_{t'}, a_{t'})|s_t, a_t]$ is the action-value function for policy $\pi$, $b(s_t)$ is the introduced baseline, and their different is known as the advantage function $A^\pi(s_t, a_t)$ By choosing the value function $V^\pi(s_t)$ as the baseline and using the temporal difference (TD) error as an unbiased estimated of the advantage function, the advantage function may be rewritten as $A^\pi(s_t, a_t) \approx (s_t, a_t) + \gamma V^{\pi(s}{}_{t+1}) - V^\pi(s_t)$.

In a multi-agent environment, the critic may be augmented, by the simulator 108, with full state-action information about policies of the other agents, which the actor has access to only local information or observed information. According to one aspect, credit assignment is dealt with in the multi-agent environment by using a counterfactual baseline:

$$b(s,a^{-n}) = \Sigma_{a'_n} \pi^n(a'^n|o^n) Q(s,(a^{-n},a'^n))$$

which marginalizes out the actions a of the agent n and allows the centralized critic to reason about the counterfactuals in which only agent n's actions change.

The simulator 108 may train a single actor, such as the first agent to generate interactive and adaptive driving behaviors, as well as a pair of decentralized and centralized critics share by all of the N number of agents. Two learning objectives may be provided via the single-agent environment and the multi-agent environment, corresponding to having the agents drive through different scenarios while following rules, and interacting with other agents for more efficient merging while maintaining an efficient traffic flow.

Since each agent may be assigned with different individual rewards, in order to learn distinct behaviors, it is difficult to extract various learning signals from a joint reward, and thus the decentralized critic may be utilized from every agent with shared parameters. The decentralized critic may provide a policy gradient for agents to learn how to drive under different scenarios (e.g., merging scenarios) by following rules while having different behaviors. The agent (e.g., the first agent) does not necessarily react to other agents initially, and will learn how to execute rational actions to finish its own task, which may be known as the first objective $J_1$. The associated policy gradient may be given by:

$$\nabla_\theta J_1(\theta) \approx \mathbb{E}_\pi[\Sigma_{n=1}^N \Sigma_t \nabla_\theta \log \pi(a_t^n|o_t^n,b^n)(r(o_t^n,a_t^n,b^n)) + \gamma V_{\phi_1}^\pi(o_{t+1}^n,b^n) - V_{\phi_1}^\pi(o_t^n,b^n)]$$

where $V_{\phi_1}^\pi(o_t^n, b^n)$ is the decentralized critic parameterized by $\phi_1$ and is updated by minimizing the loss:

$$\mathcal{L}(\phi_1) = \frac{1}{2} \sum_i \left\| r(s_{i,t}, a_{i,t}^n, b_i^n) + \gamma V_{\hat{\phi}_1}^\pi(o_{i,t+1}^n, b_i^n) - V_{\phi_1}^\pi(o_{i,t}^n, b_i^n) \right\|^2$$

where i is the number of sampled batches and $V_{\hat{\phi}_1}^\pi$ is the target network with parameters $\hat{\phi}_1$ that slowly updated towards $\phi_1$. The target network is used to stabilize the training process.

In the multi-agent environment, while strictly following traffic or priority rules may result in no accidents for merging scenarios, macroscopic-level factors such as traffic flow rate should be considered. In this regard, the centralized critic, via the simulator 108, may encourage each agent to interact with each other to maintain traffic flow and have joint success. The second objective may be objective $J_2$. The associated second policy gradient may be given by:

$$\nabla_\theta J_2(\theta) \approx \mathbb{E}_\pi[\Sigma_{n=1}^N \nabla_\theta \log \pi(a^n|o^n,b^n)(Q_{\phi_2}^\pi(s,a,b)) - \Sigma_{a'^n} \pi^n(a'^n|o^n,b^n) Q_{\phi_2}^\pi(s,(a^{-n},a'^n),b)]$$

where the counterfactual baseline discussed herein may be utilized, and the centralized critic may be defined as:

$$Q_{\phi_2}^\pi(s,a,b) = \mathbb{E}_\pi[\Sigma_{t'=t}^T \Sigma_{n=1}^N \gamma^{t'} r(s_{t'},a_{t'}^n,b^n)|s_t,a_t^n,b^n]$$

by considering a joint reward for all agents. Parameterized by $\phi_2$, the centralized critic is updated by minimizing the loss:

$$\mathcal{L}(\phi_2) = \frac{1}{2} \sum_i \left\| \sum_{n=1}^N r(s_{i,t}, a_{i,t}^n, b_i^n) + \gamma Q_{\hat{\phi}_2}^{\hat\pi}(s_i, \hat{a}_{i,t+1}, b) - Q_{\phi_2}^\pi(s_{i,t}, a_{i,t}, b) \right\|^2$$

where $\hat\pi$ denotes the target policy network and $\hat\phi_2$ represents parameters of the target centralized critic network.

The overall or combined policy gradient may be defined as:

$$\nabla_\theta J(\theta) = \alpha \nabla_\theta J_1(\theta) + (1-\alpha) \nabla_\theta J_2(\theta)$$

where $\alpha \in [0, 1]$ is the weighting factor for the two objectives $J_1(\theta)$ and $J_2(\theta)$. Because the simulator 108 utilizes two separate objectives, curriculum learning may be utilized. Thus, the simulator 108 may train the N number of agents based on the combined or overall policy gradient derived from the first policy gradient and the second policy gradient, which may be a multi-goal, multi-agent, multi-stage, interaction-aware decision making network policy based on the first agent neural network and the second agent neural network.

With reference to the adaptive behavior aspect of the interaction-aware decision making, the simulator 108 may train a multi-goal, multi-agent, multi-stage, interaction-aware decision making network policy which may be capable of generating different driving behaviors according to one or more behavioral parameters. The network policy may be based on a state, an action pair, and a reward function r(s,a,b) including variables which account for the lane priority level $b_{prio}$ and the driver type $b_{type}$. In this way, the reward function may assign negative rewards to non-cooperative drivers when their lane priority level $b_{prio}$ is less than the lane priority level of another agent involved in a collision. Further, the reward function may include two or more sub-reward functions which may be related to driving behavior $r_{finish}$ and $r_{collide}$. Each agent may be assigned a one-time reward, by the simulator 108, if the respective agent safely drives through the multi-agent environment (e.g., without causing or being involved with any collisions and reaching the goal or destination). The reward value may be $r_{finish}=f_1(b_{type})$. For example, a small final reward may be assigned to encourage the agent to finish the task or reach its goal faster than a large reward to a discount factor γ, which induces a less cooperative driver type.

If two or more agents collide or are involved in a collision, a negative reward or a penalty may be assigned to one or more of the agents involved in the collision, and this may be done based on the lane priority level of respective agents involved. In other words, $r_{collide}=f_2(b_{prio})$. As an example, if a first vehicle (e.g., one agent) is making a left turn while a second vehicle (e.g., another agent) is travelling straight and the two agents collide, the first vehicle may be assigned a greater negative reward than the second vehicle because the second vehicle has the right of way according to traffic rules, the layout of the roadway or the multi-agent environment, and based on the positioning of the respective agents. In this way, the priority determiner 1504 may, during the training of the number N of agents (e.g., stage two training in the multi-agent environment), when a collision occurs between two or more of the agents of the multi-agent environment, assign a negative reward or a penalty to the respective agents involved with the collision based on the lane priority of respective agents.

As previously noted, the Q-masker 1114 may be implemented as a masking mechanism to the policy network, thereby enhancing the efficiency of the training (e.g., this may occur in both stage one and stage two learning). In this way, the simulator 108, instead of exploring actions which are known to cause an accident or break known traffic rules, the simulator 108 may proceed to training the agents, critics, and policy directly as to how to make decisions on a tactical level, thereby mitigating training time, computing resources utilized during the training, an enhancing the operation of the system, computer, and/or processor and memory used to run the simulator 108. Three different types of masks may be utilized, including vehicle kinematics ($M_k$), traffic rules ($M_r$), and safety factors ($M_s$). Prior to selecting an action, the simulator 108 may apply the masking mechanism provided by the Q-masker 1114 so that training of an agent is conducted based on a remaining set of actions by excluding the masked set of actions from the set of possible actions. The masked set of actions may be the union of $M=(M_k) \cup (M_r) \cup (M_s)$. In this way, the Q-masker 1114 may determine the mask M to be applied to a subset of the set of possible actions for the first agent for a time interval based on the layout of the multi-agent environment or positioning of the first agent and the N agents. The simulator 108 may thus train an agent based on a remaining set of actions by excluding the masked set of actions from the set of possible actions. As previously discussed, the set of possible actions may include a no-operation action, an acceleration action, a deceleration action, a brake release action, a shift left one sub-lane action, or a shift right one sub-lane action.

The communication interface 150 of the system for interaction-aware decision making 1500 may transmit the multi-goal, multi-agent, multi-stage, interaction-aware decision making network policy to the server 160 or one of the vehicles 170, 180, thereby propagating the network policy and enabling the respective autonomous vehicles to operate accordingly. The autonomous vehicle may include a vehicle communication interface adapted to receive the network policy. Additionally, the autonomous vehicle may include one or more vehicle systems, which, as noted above, may include an autonomous driving system, a cruise control system, a collision mitigation braking system, a transmission system, brake pedal systems, an electronic power steering system, etc. The controller of the vehicle may operate one or more vehicle systems of the vehicle according to the multi-goal, multi-agent, multi-stage, interaction-aware decision making network policy.

Figure 16:
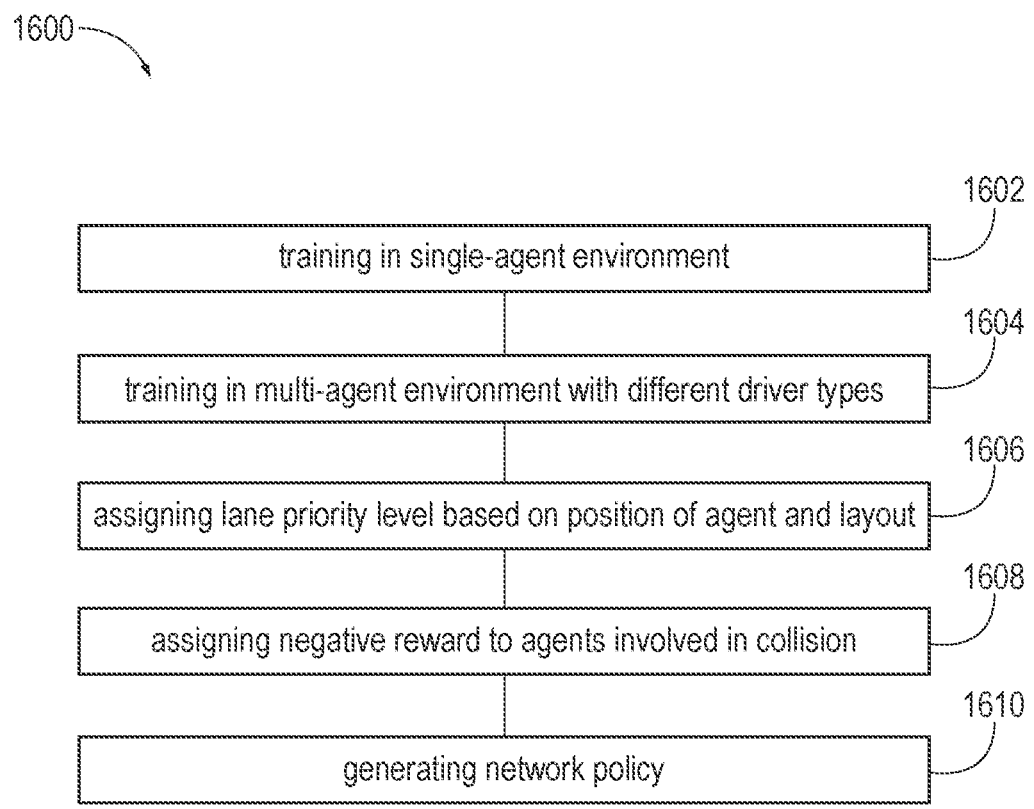
FIG. 16 is an exemplary flow diagram of a method for interaction-aware decision making, according to one aspect.

FIG. 16 is an exemplary flow diagram of a method 1600 for interaction-aware decision making, according to one aspect. According to one aspect, the method 1600 for interaction-aware decision making may include training, in a single-agent environment 1602, a first agent based on a first policy gradient and training a first critic based on a first loss function to learn one or more goals using a Markov decision process. The method 1600 for interaction-aware decision making may include training a number N of agents based on the first policy gradient and training, in a multi-agent environment with different driver types 1604, a second policy gradient and a second critic based on the first loss function and a second loss function to learn one or more of the goals using a Markov game to instantiate a second agent neural network. Each one of the N number of agents may be associated with a driver type indicative of a level of cooperation for the respective agent. The method 1600 for interaction-aware decision making may include assigning a lane priority level based 1606 on a position of the respective agent and a layout of the multi-agent environment. When a collision occurs between two or more of the agents of the multi-agent environment, assigning a negative reward 1608 or a penalty to the respective agents involved with the collision based on the lane priority level of respective agents. The method 1600 for interaction-aware decision making may include generating a network policy 1610 based on the first agent neural network and the second agent neural network.

Figure 17:
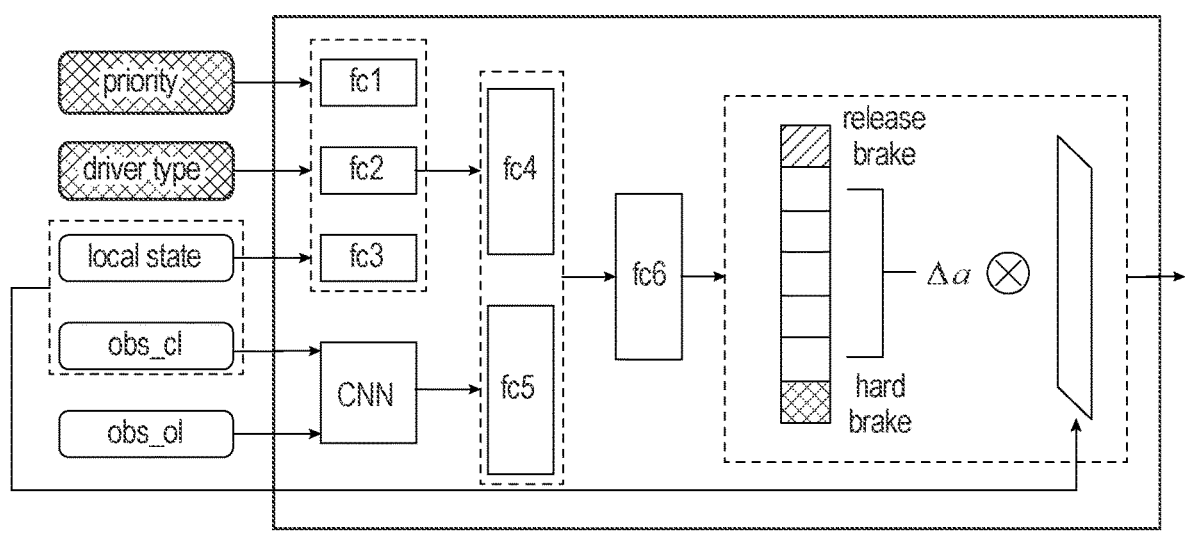
FIG. 17 is an exemplary scenario where policy network generation occurs according to systems or methods for interaction-aware decision making, according to one aspect.

FIG. 17 is an exemplary scenario where policy network generation occurs according to systems or methods for interaction-aware decision making, according to one aspect. FIG. 17 illustrates a policy network including masking mechanisms using priority and driver types as inputs for generating the policy network. In this example, 32 units in fc1, fc2, fc3, etc. layers (e.g., fully connected layers) are utilized. The open and closed observations are processed by a convolution neural network (CNN) which may include two filters of size 3×30, stride 1×1; fc3, fc5, fc6 may have neurons and ReLU may be utilized as the non-linear activation function for the layers.

Figure 18A:
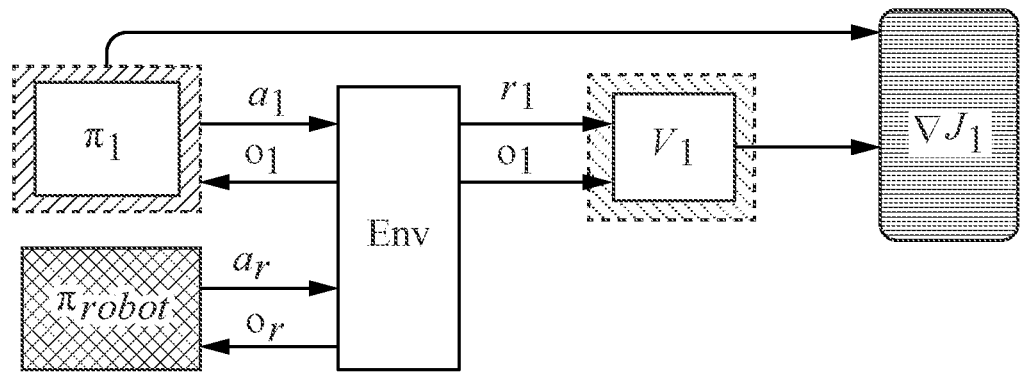
FIGS. 18A-18B are exemplary data flow diagrams in association with stage one and stage two training, respectively, for systems and methods for interaction-aware decision making, according to one aspect.
Figure 18B:
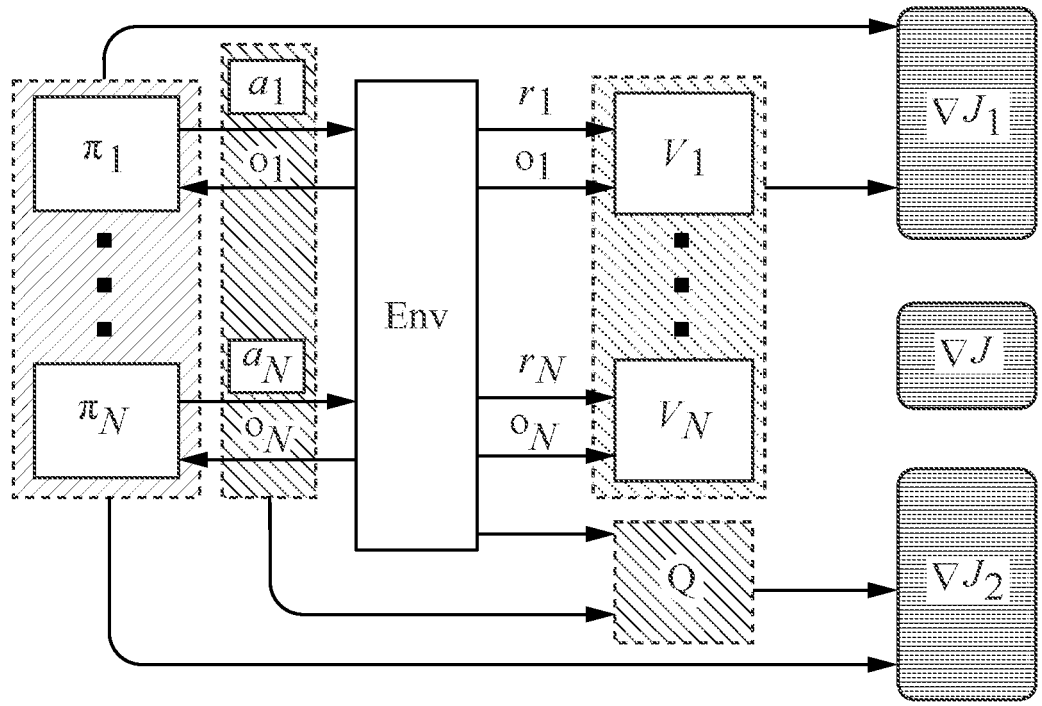

FIGS. 18A-18B are exemplary data flow diagrams in association with stage one and stage two training, respectively, for systems and methods for interaction-aware decision making, according to one aspect. FIGS. 18A-18B illustrate a proposed two-stage curriculum learning structure. V is the decentralized critic which may have the same input and network structure as the policy network. The centralized critic Q may have full information for all agents as an input and may be connected to two FC layers with 128 units.

FIGS. 19A-19D are exemplary environments associated with training agents according to systems or methods for interaction-aware decision making, according to one aspect. The environments of FIGS. 19A-19D may be implemented as the single agent environment or as the multi-agent environment. Aspects of the environments which may be known to the simulator 108 may include the road geometry, speed limit, and road priority level rules or traffic rules.

Figure 19A:
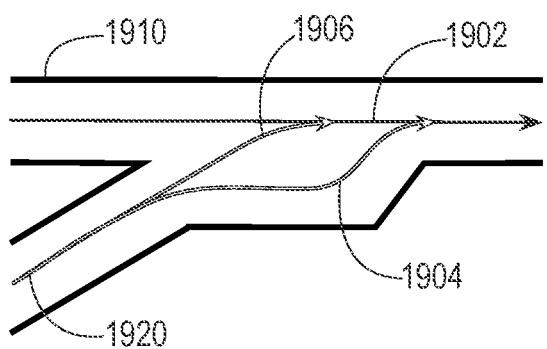
FIGS. 19A-19D are exemplary environments associated with training agents according to systems or methods for interaction-aware decision making, according to one aspect.

In FIG. 19A, a first road of a roadway or environment is a straightaway 1910 and a second road is a road including a merging lane 1920. Therefore, a vehicle at position 1902 may be assigned a greater lane priority level than a vehicle at 1904 or 1906. However, a vehicle which is sufficiently in front of another vehicle, such as a vehicle at 1904, may be assigned a greater lane priority level than a vehicle at 1906. According to other aspects, the vehicle at position 1906 may have greater lane priority than the vehicle at 1904.

Figure 19B:
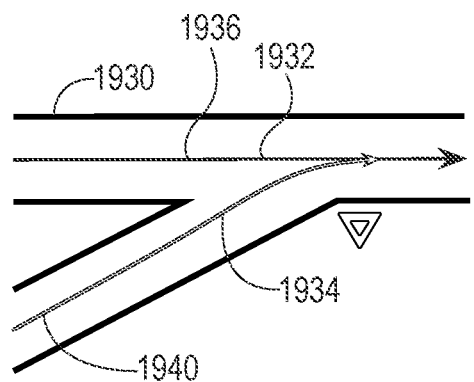

In FIG. 19B, a first road of a roadway or environment is a straightaway 1930 and a second road is a road including a merging lane 1940. Therefore, a vehicle at position 1932 may be assigned a greater lane priority level than a vehicle at 1934 or 1936. Similarly, the vehicle at position 1936 may have greater lane priority than the vehicle at 1934.

Figure 19C:
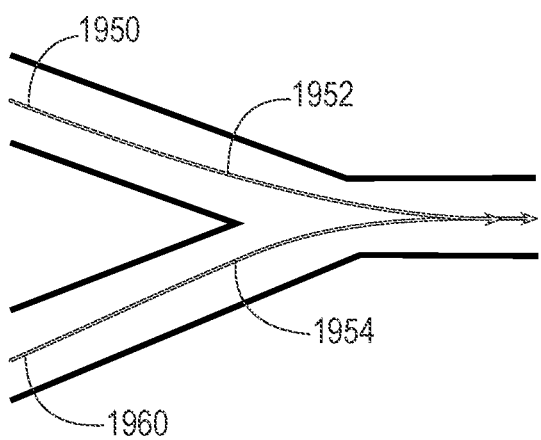

In FIG. 19C, a first road of a roadway or environment includes a merging lane 1950 and a second road is a road also includes a merging lane 1960. The vehicles at positions 1952 and 1954 may be assigned equal lane priority levels because no one has the right of way in this scenario.

Figure 19D:
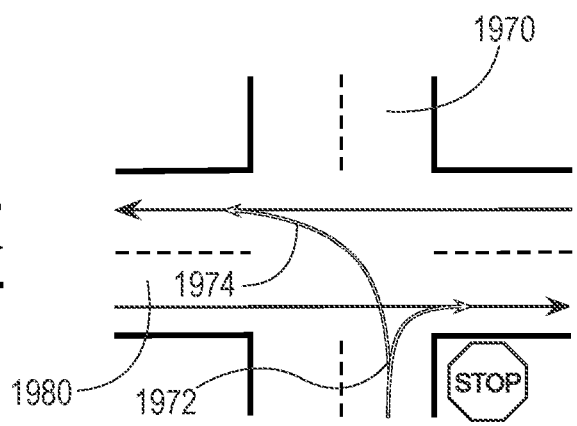

In FIG. 19D, a first road of a roadway or environment includes a road in the vertical direction 1970 and a second road in the horizontal direction 1980. The vehicle at 1972 may be assigned a greater lane level priority than a vehicle at 1974 when the vehicle at 1972 is making the left turn.

Figure 20:
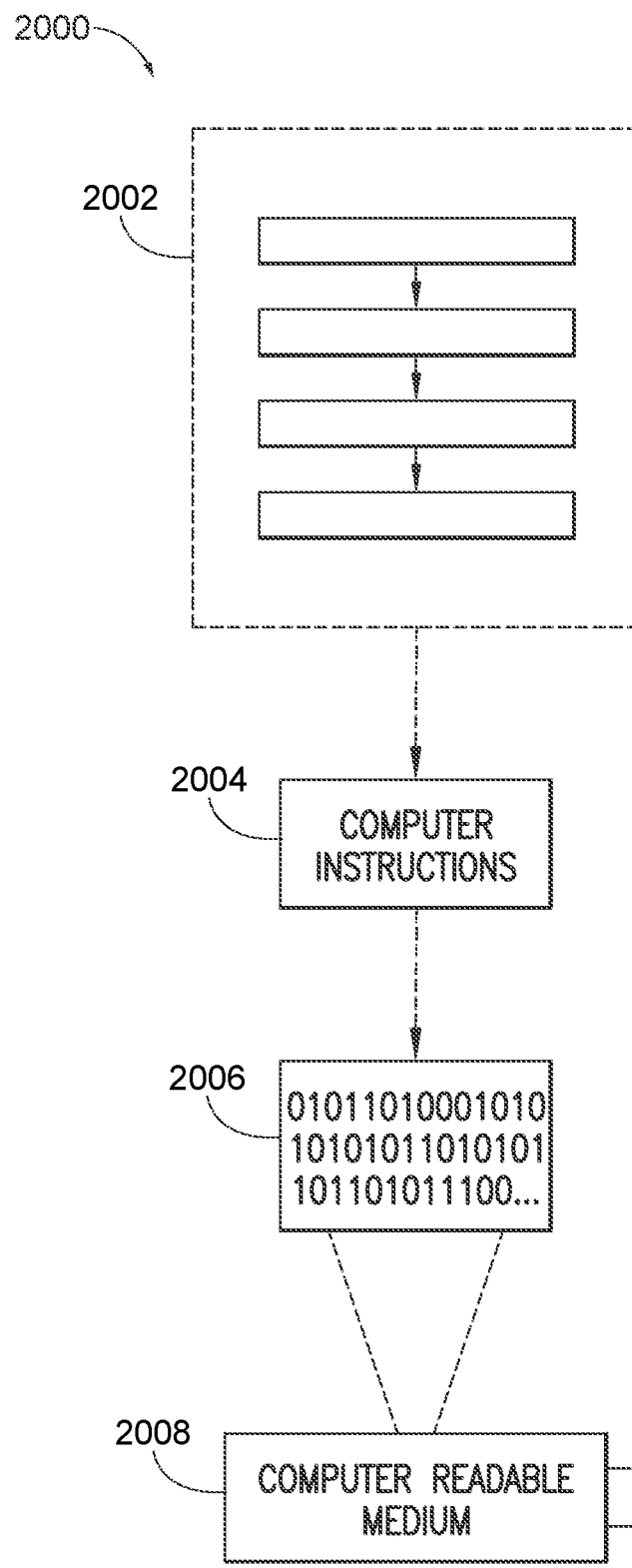
FIG. 20 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 20, wherein an implementation 2000 includes a computer-readable medium 2008, such as a CD-R, DVD-R, flash drive, a platter of a hard disk drive, etc., on which is encoded computer-readable data 2006. This encoded computer-readable data 2006, such as binary data including a plurality of zero's and one's as shown in 2006, in turn includes a set of processor-executable computer instructions 2004 configured to operate according to one or more of the principles set forth herein. In this implementation 2000, the processor-executable computer instructions 2004 may be configured to perform a method 2002, such as the method 300 of FIG. 3, the method of FIGS. 5A-5B, the method 1200 of FIG. 12, or the method 1600 of FIG. 16. In another aspect, the processor-executable computer instructions 2004 may be configured to implement a system, such as the system 100 of FIG. 1, the system 1100 of FIG. 11, or the system 1500 of FIG. 15. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 21:
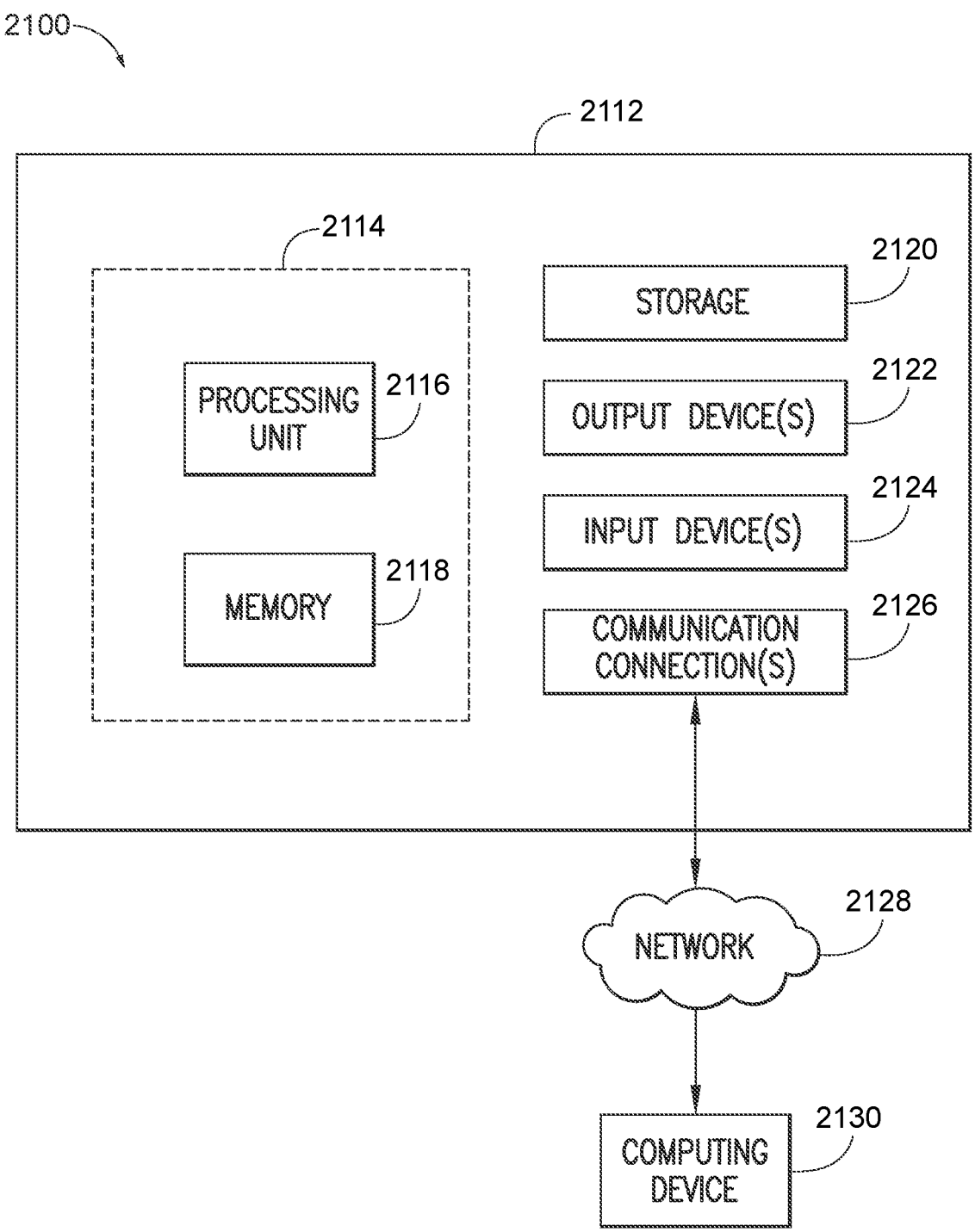
FIG. 21 is an illustration of an example computing environment where one or more of the provisions set forth herein are implemented, according to one aspect.

FIG. 21 and the following discussion provide a description of a suitable computing environment to implement aspects of one or more of the provisions set forth herein. The operating environment of FIG. 21 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 21 illustrates a system 2100 including a computing device 2112 configured to implement one aspect provided herein. In one configuration, the computing device 2112 includes at least one processing unit 2116 and memory 2118. Depending on the exact configuration and type of computing device, memory 2118 may be volatile, such as RAM, non-volatile, such as ROM, flash memory, etc., or a combination of the two. This configuration is illustrated in FIG. 21 by dashed line 2114.

In other aspects, the computing device 2112 includes additional features or functionality. For example, the computing device 2112 may include additional storage such as removable storage or non-removable storage, including, but not limited to, magnetic storage, optical storage, etc. Such additional storage is illustrated in FIG. 21 by storage 2120. In one aspect, computer readable instructions to implement one aspect provided herein are in storage 2120. Storage 2120 may store other computer readable instructions to implement an operating system, an application program, etc. Computer readable instructions may be loaded in memory 2118 for execution by processing unit 2116, for example.

The term "computer readable media" as used herein includes computer storage media. Computer storage media includes volatile and nonvolatile, removable and non-removable media implemented in any method or technology for storage of information such as computer readable instructions or other data. Memory 2118 and storage 2120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 2112. Any such computer storage media is part of the computing device 2112.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 2112 includes input device(s) 2124 such as keyboard, mouse, pen, voice input device, touch input device, infrared cameras, video input devices, or any other input device. Output device(s) 2122 such as one or more displays, speakers, printers, or any other output device may be included with the computing device 2112. Input device(s) 2124 and output device(s) 2122 may be connected to the computing device 2112 via a wired connection, wireless connection, or any combination thereof. In one aspect, an input device or an output device from another computing device may be used as input device(s) 2124 or output device(s) 2122 for the computing device 2112. The computing device 2112 may include communication connection(s) 2126 to facilitate communications with one or more other devices 2130, such as through network 2128, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for interaction-aware decision making, comprising:
    training a first agent based on a first policy gradient and training a first critic based on a first loss function to learn one or more goals in a single-agent environment, where the first agent is the only agent present, using a Markov decision process,
    wherein the first agent is associated with a first agent neural network and the first critic is associated with a first critic neural network;
    training a number N of agents based on the first policy gradient and training a second policy gradient and a second critic based on the first loss function and a second loss function to learn one or more of the goals in a multi-agent environment including the first agent and the N number of agents using a Markov game to instantiate a second agent neural network,
    wherein each one of the N number of agents is associated with a driver type indicative of a level of cooperation for each one of the N number of respective agents;
    generating a multi-goal, multi-agent, multi-stage, interaction-aware decision making network policy based on the first agent neural network and the second agent neural network; and
    determining a mask to be applied to a subset of a set of possible actions for the first agent for a time interval based on a layout of the multi-agent environment or positioning of the first agent and the N number of agents.

2. The method for interaction-aware decision making of claim 1, wherein each of the first agent and the N number of agents is associated with a lane priority level based on a position of each one of the N number of respective agents and a layout of the multi-agent environment, and wherein during the training of the number N of agents, when a collision occurs between two or more of the agents of the multi-agent environment, a negative reward or a penalty is assigned to each one of the N number of respective agents involved with the collision based on the lane priority level of each one of the N number of respective agents.

3. The method for interaction-aware decision making of claim 1, wherein the driver type is cooperative or competitive.

4. The method for interaction-aware decision making of claim 1, wherein during training of the N number of agents in the multi-agent environment, an agent of the N number of agents changes driver type mid-training.

5. The method for interaction-aware decision making of claim 1, comprising training the first agent based on a remaining set of actions by excluding the masked set of actions from the set of possible actions.

6. The method for interaction-aware decision making of claim 1, wherein the set of possible actions includes a no-operation action, an acceleration action, a deceleration action, a brake release action, a shift left one sub-lane action, or a shift right one sub-lane action.

7. The method for interaction-aware decision making of claim 1, wherein the first critic is a decentralized critic and the second critic is a centralized critic.

8. The method for interaction-aware decision making of claim 1, wherein training the first agent in the single-agent environment occurs prior to training the N number of agents in the multi-agent environment.

9. The method for interaction-aware decision making of claim 1, comprising training the N number of agents based on a combined policy gradient derived from the first policy gradient and the second policy gradient.

10. A system for interaction-aware decision making, comprising:
- a processor;
- a memory;
- a simulator implemented via the processor and memory, performing:
- training a first agent based on a first policy gradient and training a first critic based on a first loss function to learn one or more goals in a single-agent environment, where the first agent is the only agent present, using a Markov decision process,
- wherein the first agent is associated with a first agent neural network and the first critic is associated with a first critic neural network;
- training a number N of agents based on the first policy gradient and training a second policy gradient and a second critic based on the first loss function and a second loss function to learn one or more of the goals in a multi-agent environment including the first agent and the N number of agents using a Markov game to instantiate a second agent neural network,
- wherein each of the first agent and the N number of agents is associated with a lane priority level based on a position of each one of the N number of respective agents and a layout of the multi-agent environment,
- wherein during the training of the number N of agents, when a collision occurs between two or more of the agents of the multi-agent environment, a negative reward or a penalty is assigned, by the simulator, to each one of the N number of respective agents involved with the collision based on the lane priority level of each one of the N number of respective agents;
- generating a multi-goal, multi-agent, multi-stage, interaction-aware decision making network policy based on the first agent neural network and the second agent neural network; and
- a Q-Masker determining a mask to be applied to a subset of a set of possible actions for the first agent for a time interval based on a layout of the multi-agent environment or positioning of the first agent and the N number of agents.

11. The system for interaction-aware decision making of claim 10, wherein each one of the N number of respective agents is associated with a driver type indicative of a level of cooperation for the respective agent, wherein the driver type is cooperative or competitive.

12. The system for interaction-aware decision making of claim 10, wherein the simulator trains the first agent based on a remaining set of actions by excluding the masked set of actions from the set of possible actions.

13. The system for interaction-aware decision making of claim 10, wherein the set of possible actions includes a no-operation action, an acceleration action, a deceleration action, a brake release action, a shift left one sub-lane action, or a shift right one sub-lane action.

14. The system for interaction-aware decision making of claim 10, wherein the first critic is a decentralized critic and the second critic is a centralized critic.

15. The system for interaction-aware decision making of claim 10, wherein the simulator trains the first agent in the single-agent environment occurs prior to training the N number of agents in the multi-agent environment.

16. The system for interaction-aware decision making of claim 10, wherein the simulator trains the N number of agents based on a combined policy gradient derived from the first policy gradient and the second policy gradient.

17. The system for interaction-aware decision making of claim 10, comprising a communication interface transmitting the multi-goal, multi-agent, multi-stage, interaction-aware decision making network policy to a server or a vehicle.

18. A vehicle for interaction-aware decision making, comprising: a controller including a processor and a memory; one or more vehicle systems; and a vehicle communication interface receiving a multi-goal, multi-agent, multi-stage, interaction-aware decision making network policy, wherein the controller operates one or more of the vehicle systems of the vehicle according to the multi-goal, multi-agent, multi-stage, interaction-aware decision making network policy, and wherein the multi-goal, multi-agent, multi-stage, interaction-aware decision making network policy is generated by: training a first agent based on a first policy gradient and training a first critic based on a first loss function to learn one or more goals in a single-agent environment, where the first agent is the only agent present, using a Markov decision process at a first stage, wherein the first agent is associated with a first agent neural network and the first critic is associated with a first critic neural network; training a number N of agents based on the first policy gradient and training a second policy gradient and a second critic based on the first loss function and a second loss function to learn one or more of the goals in a multi-agent environment including the first agent and the N number of agents using a Markov game to instantiate a second agent neural network at a second stage, wherein each one of the N number of agents is associated with a driver type indicative of a level of cooperation for each one of the N number of respective agents; generating the multi-goal, multi-agent, multi-stage, interaction-aware decision making network policy based on the first agent neural network and the second agent neural network; and
- a Q-Masker determining a mask to be applied to a subset of a set of possible actions for the first agent for a time interval based on a layout of the multi-agent environment or positioning of the first agent and the N number of agents.

* * * * *